(12) United States Patent
Hood et al.

(10) Patent No.: US 11,636,432 B2
(45) Date of Patent: *Apr. 25, 2023

(54) SYSTEMS AND METHODS TO MEASURE AND VISUALIZE WORKLOAD FOR COMPLETING INDIVIDUAL UNITS OF WORK

(71) Applicant: Asana, Inc., San Francisco, CA (US)

(72) Inventors: Alexander Hood, San Francisco, CA (US); Nicolle Alexandra Matson, Brooklyn, NY (US)

(73) Assignee: Asana, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/862,175

(22) Filed: Jul. 11, 2022

(65) Prior Publication Data
US 2022/0343282 A1 Oct. 27, 2022

Related U.S. Application Data

(63) Continuation of application No. 17/036,742, filed on Sep. 29, 2020, now Pat. No. 11,455,601.
(Continued)

(51) Int. Cl.
*G06Q 10/0631* (2023.01)
*G06Q 10/1093* (2023.01)
(Continued)

(52) U.S. Cl.
CPC ......... *G06Q 10/103* (2013.01); *G06F 3/0484* (2013.01); *G06Q 10/063114* (2013.01);
(Continued)

(58) Field of Classification Search
None
See application file for complete search history.

(56) References Cited

U.S. PATENT DOCUMENTS

| 5,233,687 A | 8/1993 | Henderson, Jr. |
|---|---|---|
| 5,524,077 A | 6/1996 | Faaland |

(Continued)

FOREIGN PATENT DOCUMENTS

| CN | 101305350 A | 11/2008 |
|---|---|---|
| CN | 101563671 A | 10/2009 |

(Continued)

OTHER PUBLICATIONS

"U.S. Appl. No. 14/584,750, Examiner Interview Summary dated Feb. 25, 2016", 3 pgs.
(Continued)

*Primary Examiner* — Stephanie Z Delich
(74) *Attorney, Agent, or Firm* — Esplin & Associates, PC

(57) ABSTRACT

Systems and methods for measuring and visualizing user workload for completing individual units of work are disclosed. Exemplary implementations may: manage environment state information maintaining a collaboration environment configured to facilitate interaction by users with the collaboration environment, the environment state information specifying values of work unit parameters that describe units of work assigned to individual users within the collaboration environment, individual units of work having individual start dates and individual end dates; determine values of a workload parameter for the individual units of work that describe individual quantities of units of time associated with completion of the individual units of work; effectuate presentation of a user interface based on the values of the workload parameter for the individual units of work, the user interface displaying relationships between the individual quantities of units of time and the individual start dates and the individual end dates; and/or perform other operations.

20 Claims, 8 Drawing Sheets

Related U.S. Application Data

(60) Provisional application No. 62/705,470, filed on Jun. 29, 2020.

(51) Int. Cl.
*G06Q 10/105* (2023.01)
*G06Q 10/10* (2023.01)
*G06F 3/0484* (2022.01)
*G06Q 10/1091* (2023.01)

(52) U.S. Cl.
CPC ... *G06Q 10/063118* (2013.01); *G06Q 10/105* (2013.01); *G06Q 10/1091* (2013.01); *G06Q 10/1093* (2013.01)

(56) References Cited

U.S. PATENT DOCUMENTS

| | | |
|---|---|---|
| 5,530,861 A | 6/1996 | Diamant |
| 5,608,898 A | 3/1997 | Turpin |
| 5,611,076 A | 3/1997 | Durflinger |
| 5,623,404 A | 4/1997 | Collins |
| 5,721,770 A | 2/1998 | Kohler |
| 5,983,277 A | 11/1999 | Heile |
| 6,024,093 A | 2/2000 | Cron |
| 6,256,651 B1 | 7/2001 | Tuli |
| 6,292,830 B1 | 9/2001 | Taylor |
| 6,332,147 B1 | 12/2001 | Moran |
| 6,385,639 B1 | 5/2002 | Togawa |
| 6,621,505 B1 | 9/2003 | Beauchamp |
| 6,629,081 B1 | 9/2003 | Cornelius |
| 6,769,013 B2 | 7/2004 | Frees |
| 6,859,523 B1 | 2/2005 | Jilk |
| 6,938,048 B1 | 8/2005 | Jilk |
| 7,003,668 B2 | 2/2006 | Berson |
| 7,020,697 B1 | 3/2006 | Goodman |
| 7,039,596 B1 | 5/2006 | Lu |
| 7,039,654 B1 | 5/2006 | Eder |
| 7,086,062 B1 | 8/2006 | Faour |
| 7,146,326 B1 | 12/2006 | White |
| 7,155,400 B1 | 12/2006 | Jilk |
| 7,349,920 B1 | 3/2008 | Feinberg |
| 7,401,131 B2 | 7/2008 | Robertson |
| 7,418,482 B1 | 8/2008 | Lusher |
| 7,428,723 B2 | 9/2008 | Greene |
| 7,640,511 B1 | 12/2009 | Keel |
| 7,644,145 B2 | 1/2010 | Rockwell |
| 7,676,542 B2 | 3/2010 | Moser |
| 7,702,532 B2 | 4/2010 | Vigil |
| 7,778,866 B2 | 8/2010 | Hughes |
| 7,779,039 B2 | 8/2010 | Weissman |
| RE41,737 E | 9/2010 | Leem |
| 7,792,795 B1 | 9/2010 | Swartz |
| 7,805,327 B1 | 9/2010 | Schulz |
| RE41,848 E | 10/2010 | Daniell |
| 7,831,978 B2 | 11/2010 | Schaad |
| 7,840,943 B2 | 11/2010 | Volkov |
| 7,917,855 B1 | 3/2011 | Satish |
| 7,941,453 B1 | 5/2011 | Scheevel |
| 7,945,469 B2 | 5/2011 | Cohen |
| 7,996,744 B2 | 8/2011 | Ojala |
| 7,996,774 B1 | 8/2011 | Sidenur |
| 8,214,747 B1 | 7/2012 | Yankovich |
| 8,314,809 B1 | 11/2012 | Grabowski |
| 8,499,300 B2 | 7/2013 | Zimberg |
| 8,522,240 B1 | 8/2013 | Merwarth |
| 8,527,287 B1 | 9/2013 | Bhatia |
| 8,554,832 B1 | 10/2013 | Moskovitz |
| 8,572,477 B1 | 10/2013 | Moskovitz |
| 8,626,547 B2 | 1/2014 | Hirano |
| 8,627,199 B1 | 1/2014 | Handley |
| 8,639,552 B1 | 1/2014 | Chen |
| 8,768,751 B2 | 7/2014 | Jakowski |
| 8,831,879 B2 | 9/2014 | Stamm |
| 8,843,832 B2 | 9/2014 | Frields |
| 8,863,021 B1 | 10/2014 | Bee |
| 9,009,096 B2 | 4/2015 | Pinckney |
| 9,024,752 B2 | 5/2015 | Tumayan |
| 9,143,839 B2 | 9/2015 | Reisman |
| 9,152,668 B1 | 10/2015 | Moskovitz |
| 9,201,952 B1 | 12/2015 | Chau |
| 9,208,262 B2 | 12/2015 | Bechtel |
| 9,251,484 B2 | 2/2016 | Cantor |
| 9,350,560 B2 | 5/2016 | Hupfer |
| 9,383,917 B2 | 7/2016 | Mouton |
| 9,405,532 B1 | 8/2016 | Sullivan |
| 9,405,810 B2 | 8/2016 | Smith |
| 9,454,623 B1 | 9/2016 | Kaptsan |
| 9,514,424 B2 | 12/2016 | Kleinbart |
| 9,600,136 B1 | 3/2017 | Yang |
| 9,674,361 B1 | 6/2017 | Ristock |
| 9,712,576 B1 | 7/2017 | Gill |
| 9,785,445 B2 | 10/2017 | Mitsui |
| 9,830,398 B2 | 11/2017 | Schneider |
| 9,842,312 B1 | 12/2017 | Rosati |
| 9,949,681 B2 | 4/2018 | Badenes |
| 9,953,282 B2 | 4/2018 | Shaouy |
| 9,959,420 B2 | 5/2018 | Kiang |
| 9,978,040 B2 | 5/2018 | Lee |
| 9,990,636 B1 | 6/2018 | Lewis |
| 10,001,911 B2 | 6/2018 | Breedvelt-Schouten |
| 10,003,693 B2 | 6/2018 | Wolthuis |
| 10,083,412 B2 | 9/2018 | Suntinger |
| 10,157,355 B2 | 12/2018 | Johnson |
| 10,192,181 B2 | 1/2019 | Katkar |
| 10,235,156 B2 | 3/2019 | Johnson |
| 10,264,067 B2 | 4/2019 | Subramani |
| 10,308,992 B2 | 6/2019 | Chauvin |
| 10,373,084 B2 | 8/2019 | Kurjanowicz |
| 10,373,090 B2 | 8/2019 | Holm |
| 10,382,501 B2 | 8/2019 | Malatesha |
| 10,455,011 B2 | 10/2019 | Kendall |
| 10,496,943 B2 | 12/2019 | De |
| 10,594,788 B2 | 3/2020 | Larabie-Belanger |
| 10,606,859 B2 | 3/2020 | Smith |
| 10,613,735 B1 | 4/2020 | Karpe |
| 10,616,151 B1 | 4/2020 | Cameron |
| 10,623,359 B1 | 4/2020 | Rosenstein |
| 10,671,692 B2 | 6/2020 | Koopman |
| 10,684,870 B1 | 6/2020 | Sabo |
| 10,706,484 B1 | 7/2020 | Murnock |
| 10,785,046 B1 | 9/2020 | Raghavan |
| 10,810,222 B2 | 10/2020 | Koch |
| 10,846,105 B2 | 11/2020 | Granot |
| 10,846,297 B2 | 11/2020 | Smith |
| 10,922,104 B2 | 2/2021 | Sabo |
| 10,956,845 B1 | 3/2021 | Sabo |
| 10,970,299 B2 | 4/2021 | Smith |
| 10,977,434 B2 | 4/2021 | Pelz |
| 10,983,685 B2 | 4/2021 | Karpe |
| 11,082,281 B2 | 8/2021 | Justin |
| 11,095,468 B2 | 8/2021 | Pandey |
| 11,113,667 B1 | 9/2021 | Jiang |
| 11,138,021 B1 | 10/2021 | Rosenstein |
| 11,140,174 B2 | 10/2021 | Patel |
| 11,204,683 B1 | 12/2021 | Sabo |
| 11,212,242 B2 | 12/2021 | Cameron |
| 11,263,228 B2 | 3/2022 | Koch |
| 11,288,081 B2 | 3/2022 | Sabo |
| 11,290,296 B2 | 3/2022 | Raghavan |
| 11,327,645 B2 | 5/2022 | Karpe |
| 11,341,444 B2 | 5/2022 | Sabo |
| 11,341,445 B1 | 5/2022 | Cheng |
| 2002/0065798 A1 | 5/2002 | Bostleman |
| 2002/0082889 A1 | 6/2002 | Oliver |
| 2002/0143594 A1 | 10/2002 | Kroeger |
| 2003/0028595 A1 | 2/2003 | Vogt |
| 2003/0036934 A1 | 2/2003 | Ouchi |
| 2003/0041317 A1 | 2/2003 | Sokolov |
| 2003/0097406 A1 | 5/2003 | Stafford |
| 2003/0097410 A1 | 5/2003 | Atkins |
| 2003/0126001 A1 | 7/2003 | Northcutt |
| 2003/0200223 A1 | 10/2003 | Hack |
| 2003/0225598 A1 | 12/2003 | Yu |

(56) References Cited

U.S. PATENT DOCUMENTS

| | | |
|---|---|---|
| 2003/0233265 A1 | 12/2003 | Lee |
| 2003/0233268 A1 | 12/2003 | Taqbeem |
| 2004/0083448 A1 | 4/2004 | Schulz |
| 2004/0093290 A1 | 5/2004 | Doss |
| 2004/0093351 A1 | 5/2004 | Lee |
| 2004/0098291 A1 | 5/2004 | Newburn |
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2004/0268451 A1 | 12/2004 | Robbin |
| 2005/0210394 A1 | 9/2005 | Crandall |
| 2005/0216111 A1 | 9/2005 | Ooshima |
| 2005/0222971 A1 | 10/2005 | Cary |
| 2006/0028917 A1 | 2/2006 | Wigginton |
| 2006/0047454 A1 | 3/2006 | Tamaki |
| 2006/0085245 A1 | 4/2006 | Takatsuka |
| 2006/0095859 A1 | 5/2006 | Booking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0120129 A1 | 5/2008 | Seubert |
| 2008/0126930 A1 | 5/2008 | Scott |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2009/0307349 A1 | 12/2009 | Harris |
| 2010/0005087 A1 | 1/2010 | Basco |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0215116 A1 | 8/2013 | Siddique |

(56) References Cited

U.S. PATENT DOCUMENTS

| | | |
|---|---|---|
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0254299 A1 | 9/2013 | Burshtein |
| 2013/0275229 A1 | 10/2013 | Moganti |
| 2013/0279685 A1 | 10/2013 | Kohler |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0025767 A1 | 1/2014 | De Kezel |
| 2014/0036639 A1 | 2/2014 | Taber |
| 2014/0040780 A1 | 2/2014 | Brian |
| 2014/0040905 A1 | 2/2014 | Tadanobu |
| 2014/0058801 A1 | 2/2014 | Deodhar |
| 2014/0059910 A1 | 3/2014 | Norton |
| 2014/0074536 A1 | 3/2014 | Meushar |
| 2014/0089719 A1 | 3/2014 | Daum |
| 2014/0101310 A1 | 4/2014 | Savage |
| 2014/0156539 A1 | 6/2014 | Brunet |
| 2014/0165001 A1 | 6/2014 | Shapiro |
| 2014/0172478 A1 | 6/2014 | Vadasz |
| 2014/0189017 A1 | 7/2014 | Prakash |
| 2014/0200944 A1 | 7/2014 | Henriksen |
| 2014/0208325 A1 | 7/2014 | Chen |
| 2014/0215344 A1 | 7/2014 | Ligman |
| 2014/0229609 A1 | 8/2014 | Wong |
| 2014/0236663 A1 | 8/2014 | Smith |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |
| 2014/0310047 A1 | 10/2014 | De |
| 2014/0310051 A1 | 10/2014 | Meng |
| 2014/0350997 A1 | 11/2014 | Holm |
| 2014/0364987 A1 | 12/2014 | Shikano |
| 2015/0006448 A1 | 1/2015 | Gupta |
| 2015/0007058 A1 | 1/2015 | Wooten |
| 2015/0012330 A1 | 1/2015 | Sugiura |
| 2015/0052437 A1 | 2/2015 | Crawford |
| 2015/0058053 A1 | 2/2015 | De |
| 2015/0113540 A1 | 4/2015 | Rabinovici |
| 2015/0134393 A1 | 5/2015 | De |
| 2015/0153906 A1 | 6/2015 | Liao |
| 2015/0213411 A1 | 7/2015 | Swanson |
| 2015/0215256 A1 | 7/2015 | Ghafourifar |
| 2015/0262111 A1 | 9/2015 | Yu |
| 2015/0294245 A1 | 10/2015 | Nagar |
| 2015/0312375 A1 | 10/2015 | Valey |
| 2015/0317595 A1 | 11/2015 | De |
| 2015/0339006 A1 | 11/2015 | Chaland |
| 2015/0363092 A1 | 12/2015 | Morton |
| 2015/0363733 A1 | 12/2015 | Brown |
| 2015/0379472 A1 | 12/2015 | Gilmour |
| 2016/0012368 A1 | 1/2016 | O'Connell |
| 2016/0048408 A1 | 2/2016 | Madhu |
| 2016/0048786 A1 | 2/2016 | Fukuda |
| 2016/0063192 A1 | 3/2016 | Johnson |
| 2016/0063449 A1 | 3/2016 | Duggan |
| 2016/0072750 A1 | 3/2016 | Kass |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0147773 A1 | 5/2016 | Smith |
| 2016/0147846 A1 | 5/2016 | Smith |
| 2016/0148157 A1 | 5/2016 | Walia |
| 2016/0180277 A1 | 6/2016 | Skiba |
| 2016/0180298 A1 | 6/2016 | McClement |
| 2016/0182311 A1 | 6/2016 | Borna |
| 2016/0188145 A1 | 6/2016 | Vida |
| 2016/0216854 A1 | 7/2016 | McClellan |
| 2016/0224939 A1 | 8/2016 | Chen |
| 2016/0234391 A1 | 8/2016 | Wolthuis |
| 2016/0275436 A1 | 9/2016 | Kurjanowicz |
| 2016/0300024 A1 | 10/2016 | Janssen |
| 2016/0313934 A1 | 10/2016 | Isherwood |
| 2016/0328217 A1 | 11/2016 | Hagerty |
| 2016/0342927 A1 | 11/2016 | Reznik |
| 2017/0004213 A1 | 1/2017 | Cunico |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0061341 A1 | 3/2017 | Haas |
| 2017/0068933 A1 | 3/2017 | Norton |
| 2017/0093874 A1 | 3/2017 | Uthe |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0147960 A1 | 5/2017 | Jahagirdar |
| 2017/0153799 A1 | 6/2017 | Hoyer |
| 2017/0154024 A1 | 6/2017 | Subramanya |
| 2017/0177671 A1 | 6/2017 | Allgaier |
| 2017/0185592 A1 | 6/2017 | Frei |
| 2017/0192642 A1 | 7/2017 | Fishman |
| 2017/0206217 A1 | 7/2017 | Deshpande |
| 2017/0249577 A1 | 8/2017 | Nishikawa |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0344754 A1 | 11/2017 | Kumar |
| 2017/0346861 A1 | 11/2017 | Pearl |
| 2017/0351385 A1 | 12/2017 | Ertmann |
| 2018/0032524 A1 | 2/2018 | Byron |
| 2018/0052943 A1 | 2/2018 | Hui |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0075387 A1 | 3/2018 | Kulkarni |
| 2018/0088754 A1 | 3/2018 | Psenka |
| 2018/0089625 A1 | 3/2018 | Rosati |
| 2018/0095938 A1 | 4/2018 | Monte |
| 2018/0102989 A1 | 4/2018 | Borsutsky |
| 2018/0131649 A1 | 5/2018 | Ma |
| 2018/0157477 A1 | 6/2018 | Johnson |
| 2018/0165610 A1 | 6/2018 | Dumant |
| 2018/0173386 A1 | 6/2018 | Adika |
| 2018/0189706 A1 | 7/2018 | Newhouse |
| 2018/0189736 A1 | 7/2018 | Guo |
| 2018/0225795 A1 | 8/2018 | Napoli |
| 2018/0247352 A1 | 8/2018 | Rogers |
| 2018/0260081 A1 | 9/2018 | Beaudoin |
| 2018/0262620 A1 | 9/2018 | Wolthuis |
| 2018/0285471 A1 | 10/2018 | Hao |
| 2018/0316636 A1 | 11/2018 | Kamat |
| 2018/0331842 A1 | 11/2018 | Faulkner |
| 2018/0357049 A1 | 12/2018 | Epstein |
| 2018/0367477 A1 | 12/2018 | Hariram |
| 2018/0367483 A1 | 12/2018 | Rodriguez |
| 2018/0373804 A1 | 12/2018 | Zhang |
| 2019/0005048 A1 | 1/2019 | Crivello |
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0068390 A1 | 2/2019 | Gross |
| 2019/0079909 A1 | 3/2019 | Purandare |
| 2019/0080289 A1 | 3/2019 | Kreitler |
| 2019/0095839 A1 | 3/2019 | Itabayashi |
| 2019/0095846 A1 | 3/2019 | Gupta |
| 2019/0102700 A1 | 4/2019 | Babu |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1 | 5/2019 | Balakrishna |

(56) References Cited

U.S. PATENT DOCUMENTS

| | | |
|---|---|---|
| 2019/0187987 A1 | 6/2019 | Fauchère |
| 2019/0213509 A1 | 7/2019 | Burleson |
| 2019/0265821 A1 | 8/2019 | Pearl |
| 2019/0340296 A1 | 11/2019 | Cunico |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0370320 A1 | 12/2019 | Kalra |
| 2020/0019907 A1 | 1/2020 | Notani |
| 2020/0059539 A1 | 2/2020 | Wang |
| 2020/0065736 A1 | 2/2020 | Relangi |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |
| 2020/0219061 A1 | 7/2020 | Guo |
| 2020/0228474 A1 | 7/2020 | Cameron |
| 2020/0233879 A1 | 7/2020 | Papanicolaou |
| 2020/0244611 A1 | 7/2020 | Rosenstein |
| 2020/0328906 A1 | 10/2020 | Raghavan |
| 2020/0344253 A1 | 10/2020 | Kurup |
| 2021/0004380 A1 | 1/2021 | Koch |
| 2021/0004381 A1 | 1/2021 | Smith |
| 2021/0097466 A1 | 4/2021 | Sabo |
| 2021/0103451 A1 | 4/2021 | Sabo |
| 2021/0110347 A1 | 4/2021 | Khalil |
| 2021/0136012 A1 | 5/2021 | Barbitta |
| 2021/0182475 A1 | 6/2021 | Pelz |
| 2021/0216562 A1 | 7/2021 | Smith |
| 2021/0232282 A1 | 7/2021 | Karpe |
| 2021/0319389 A1 | 10/2021 | Jafari |
| 2021/0320891 A1 | 10/2021 | Rosenstein |
| 2021/0342786 A1 | 11/2021 | Jiang |
| 2021/0350303 A1 | 11/2021 | Omar |
| 2021/0382734 A1 | 12/2021 | Rosenstein |
| 2022/0019320 A1 | 1/2022 | Sabo |
| 2022/0058548 A1 | 2/2022 | Garg |
| 2022/0075792 A1 | 3/2022 | Koch |
| 2022/0078142 A1 | 3/2022 | Cameron |
| 2022/0158859 A1 | 5/2022 | Raghavan |
| 2022/0171637 A1 | 6/2022 | Sabo |
| 2022/0188715 A1 | 6/2022 | Cheng |
| 2022/0214787 A1 | 7/2022 | Karpe |
| 2022/0215315 A1 | 7/2022 | Sabo |

FOREIGN PATENT DOCUMENTS

| | | |
|---|---|---|
| CN | 102378975 B | 5/2015 |
| WO | 2015036817 A1 | 3/2015 |
| WO | 2015123751 A1 | 8/2015 |
| WO | 2020006634 A1 | 1/2020 |

OTHER PUBLICATIONS

"U.S. Appl. No. 14/584,750, Non Final Office Action dated Aug. 28, 2015", 21 pgs.

"U.S. Appl. No. 14/584,750, Notice of Allowance dated Mar. 28, 2016", 8 pgs.

"U.S. Appl. No. 14/584,750, Response filed Feb. 29, 2015 to Non Final Office Action dated Aug. 28, 2015", 16 pgs.

"U.S. Appl. No. 14/584,850, Final Office Action dated Sep. 1, 2017", 31 pgs.

"U.S. Appl. No. 14/584,850, Non Final Office Action dated Jan. 10, 2017", 9 pgs.

"U.S. Appl. No. 14/584,850, Response filed Apr. 10, 2017 to Non Final Office Action dated Jan. 10, 2017", 13 pgs.

"How to Asana: Inviting teammates to Asana." YouTube, Asana, Mar. 21, 2017, https://www.youtube.com/watch?v=TLOruY1KyxU ( Year: 2017), 13 pages.

"Rules of Data Conversion from Document to Relational Databases", published: 2014, publisher: Future-processing, pp. 1-8 (Year: 2014).

(Tiburca, Andrew) Best Team Calendar Applications for 2018—Toggl https://toggl.com/blog/best-team-calendar-applications-for-2018 (Year: 2017).

Asana Demo and Product Tour, you tube excerpt, Dec. 7, 2017 https://www.youtube.com/watch?v=IMAFWVLGFyw (Year: 2017) (16 pages).

Asana integrations, Asana tutorial, youtube, excerpt, Nov. 16, 2016 https://www.youtube.com/watch?v=hBiQ7DJNinE (Year: 2016) (21 pages).

Asana Workload and Portfolios,youtube,excerpt, Aug. 1, 2019 https://www.youtube.com/watch?v=7XkNcfFDG6M (Year: 2019) (20 pages).

Asana YouTube channel, list of all product videos, Nov. 19, 2014-Aug. 19, 2019 https://www.youtube.com/user/AsanaTeam/videos?disable_polymer=1 (Year: 2019) (5 pages).

Asana, Task dependencies, archives org, Aug. 25, 2017 https://web.archive.org/web/20170825002141/https://asana.com/guide/help/tasks/dependencies (Year: 2017) (5 pages).

Asana,Manage your team capacity with Workload, youtube, excerpt, Aug. 1, 2019 https://www.youtube.com/watch?v=2ufXyZDzZnA &list=PLJFG93oi0wJAi UwyOhlGWHdtJzJrzylBv (Year: 2019) (1 page).

Assef, F., Cassius, T. S., & Maria, T. S. (2018). Confrontation between techniques of time measurement. Journal of Manufacturing Technology Management, 29(5), 789-810. (Year: 2018).

Biggs, "GateGuru Relaunches With New Ways to Streamline Your Travel Experience", Techcrunch, (Apr. 26, 2013), 3 pgs.

Castaneda Samuel, Introduction Manual—Asana, Sep. 25, 2017 https://static1.squarespace.com/static/5860532ae58c6232db243a65/t/5c210c101950b7fc7a8e3274/1545669658049/Asana+Manual.pdf (Year: 2017) (20 pages).

Command and control, Wikipedia, archives org, Mar. 16, 2018 https://web.archive.org/web/20180316193655/https://en.wikipedia.org/wiki/Command_and_control (Year: 2018), 6 pages.

Creating Tables with Fields from 2 Different Tables, published: 2009, publisher: StackOverflow, pp. 1-2. (Year 2009).

Critical chain project management, Wikipedia, archives org, Dec. 17, 2016 https://web.archive.Org/web/20161217090326/https://en.wikipedia.org/wiki/Critical_chain_project_management (Year: 2016) 5 pages.

Critical Path Method, Wikipedia, archives org, Sep. 19, 2017 https://web.archive.Org/web/20170919223814/https://en.wikipedia.org/wiki/Critical_path_method (Year: 2017) 6 pages.

Dawei Li, "Deepcham: Collaborative Edge-Mediated Adaptive Deep Learning for Mobile Object Recognition", 2016, IEEE/ACM, pp. 64-76 (Year: 2016).

Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.

Hartmann, "TimeProjectscheduling with resource capacities and requests varying with time: a case study," 2013, Flexible services and manufacturing journal, vol. 25, No. 1, pp. 74-93 (Year: 2013).

Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).

How to Asana Asana time tracking, youtube, excerpt, May 24, 2017 https://www.youtube.com/watch?v=291qlex-TLc (Year: 2017) (1 page).

How to Asana, Asana project management, youtube, excerpt, Mar. 7, 2017 https://www.youtube.com/watch?v=qqANMTvVpE (Year: 2017) (28 pages).

How to Asana, Creating your first Asana project, youtube, excerpt, Jan. 31, 2017 https://www.youtube.com/watch?v=L04WmcUdsLo (Year: 2017) (1 page).

How to Asana, Getting Asana into your workflow, youtube, excerpt, Jul. 17, 2017 https://www.youtube.com/watch?v=7YLrNMdv3o (Year: 2017) (24 pages).

How to Asana, Planning with Asana calendar, youtube excerpt, Feb. 14, 2017 https://www.youtube.com/watch?v=w8t6KYiVPyc (Year: 2017) (19 pages).

(56) References Cited

OTHER PUBLICATIONS

How to Asana, Using Asana for task management, youtube, excerpt, Feb. 7, 2017 https://www.youtube.com/watch?v=vwvbgiejhQ (Year: 2017) (8 pages).

How to Asana, Visualizing work with Asana kanban boards, youtube, excerpt, Feb. 21, 2017 https://www.youtube.com/watch?v=jmZaZGydfPY (Year: 2017) (41 pages).

How to Asana, Workflow management, youtube, excerpt, May 30, 2017 https://www.youtube.com/watch?v=rk8nPWmXsRo (Year: 2017) (9 pages).

How to use Advanced Search in Asana, Asana tutorial, May 25, 2016 https://www.youtube.com/watch?v=5VyJ3toPfQM (Year: 2016) (28 pages).

Justin Rosenstein, Unveiling the Future of Asana, Mar. 28, 2018 https://www.youtube.com/watch?v=nRI?d_WM4Bc (Year: 2018) (2 pages).

Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).

Macro, computer science, Wikipedia, archives org, 6 pages, Feb. 11, 2020 http://web.archive.org/web/20200211082902/https://en.wikipedia.org/wiki/Macro_(computer_science) (Year: 2020).

Mauricio Aizawa, Zapier, How to Automate Asana Tasks creation using Evernote, youtube excerpts, Mar. 16, 2018 https://www.youtube.com/watch?v=BjDQ4Gny4Wl (Year: 2018) (8 pages).

Paul Minors, How to automate your tasks, youtube excerpts, Oct. 18, 2019 https://www.youtube.com/watch?v=lwF9XyUQrzw (Year: 2019).

Prioritize My Tasks in Asana, Asana tutorial, youtube, excerpt, May 25, 2016 https://www.youtube.com/watch?v=UbCnMvw01nl (Year: 2016) (3 pages).

Project views, Asana tutorial, youtube, excerpt May 25, 2016 https://www.youtube.com/watch?v=FYjA8ZH3ceQ (Year: 2016) (5 pages).

Using Asana Premium, Asana tutorial, youtube, excerpt, Sep. 10, 2016 https://www.youtube.com/watch?v=vMgLtDDmyeo (Year: 2016) (4 pages).

Where does Asana fit in, archives org, Jul. 8, 2017 https://web.archive.org/web/20170708150928/https://asana.com/guide/resources/infosheets/where-does-asana-fit (Year: 2017) (5 pages).

Wix.Com, How to Use Wix Code with Marketing Tools to Create Custom Events, Oct. 18, 2018, YouTube, https://www.youtube.com/watch?v=MTBVykOYGvO&feature=emb_title, 2 pages.

www.asana.com (as retrieved from https://web.archive.Org/web/20160101054536/https://asana.com/press and https://web.archive.org/web/20160101054527/https://asana.com/product) (Year: 2016) 15 pages.

www.cogmotive.com/blog/author/alan Alan Byrne: "Creating a company Shared Calendar in Office 365"; pp. 1-17; Sep. 10, 2013 (16 pages).

SYSTEMS AND METHODS TO MEASURE AND VISUALIZE WORKLOAD FOR COMPLETING INDIVIDUAL UNITS OF WORK

FIELD OF THE DISCLOSURE

The present disclosure relates to systems and methods to measure and visualize workload or completing individual units of work.

BACKGROUND

Collaboration environments, sometimes referred to as integrated collaboration environments, may enable users to assign projects, units of work, or other assignments to assignees (e.g., other users) to complete. A collaboration environment may comprise an environment in which a virtual team of users does its work. A collaboration environment may enable users to work in a more organized and efficient manner. A collaboration environment may integrate features and/or functionality such as web-based conferencing and collaboration, desktop videoconferencing, and/or instant message into a single easy-to-use, intuitive interface.

SUMMARY

One aspect of the present disclosure relates to a system configured to measure and visualize workload for completing individual units of work. Collaboration environments may be able to show start dates and/or due dates for completed individual units of work. Traditional collaboration environments may not provide meaningful data for some teams and/or positions regarding workload to complete units of work over a span of days and how much work may remain. For example, even if a start date and/or due date of a unit of work assigned to a user is known, this may not provide an accurate measure of how much time the user should spend or is allowed to spend, when completing the unit of work. One or more implementations described herein may determine values of a parameter by which workload is determined (herein referred to as a "workload parameter"), which may describe units of work assigned to a user on the basis of one or more of quantities of units of time (e.g., hours and/or other units) associated with completion of individual units of work, quantities of units of work production associated with completion of individual units of work, and/or other quantities used to measure workload completion. A measure of workload to complete units of work may provide workers with more insightful data so that they make sure that they work on the units of work within the time suggested, allowed, and/or allotted (which can facilitate staying within budgets and/or tracking performance efficiency of workers). Quantities of units of work production may be measured based on one or more of lines of copy, lines of code (computer program code), budget consumed, and/or other measure of work production.

One or more implementations of a system to measure and visualize workload for completing individual units of work may include one or more hardware processors configured by machine-readable instructions. The machine-readable instructions may include one or more instruction components. The instruction components may include computer program components. Instruction components may include environment state component, workload component, user interface component, and/or other instruction components.

The environment state component may be configured to manage environment state information maintaining a collaboration environment. The collaboration environment may be configured to facilitate interaction by users with the collaboration environment. The environment state information may specify values of work unit parameters of the individual units of work and/or other information. The values of the work unit parameters may describe units of work assigned to individual users within the collaboration environment. The individual units of work may have individual start dates, individual end dates, and/or other individual dates associated therewith. By way of non-limiting illustration, the values of the work unit parameters may describe a first unit of work currently assigned to a first user, one or more other units of work currently assigned to the first user, and/or one or more units of work assigned to one or more other users. The first unit of work may have a start date, an end date, and/or may be associated with other information.

The workload component may be configured to determine values of a workload parameter for the individual units of work. The values of the workload parameter describe individual quantities of units of time associated with completion of the individual units of work. By way of non-limiting illustration, the first value of the workload parameter may be determined for the first unit of work. The first value may describe a first quantity of units of time to complete the first unit of work.

The user interface component may be configured to effectuate presentation of a user interface based on the values of the workload parameter for the individual units of work and/or other information. The user interface may display relationships between the individual quantities of units of time, the individual start dates, the individual end dates, and/or other information. By way of non-limiting example, the user interface may display, for the first unit of work, the first quantity of units of time in relation to the start date and the end date.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
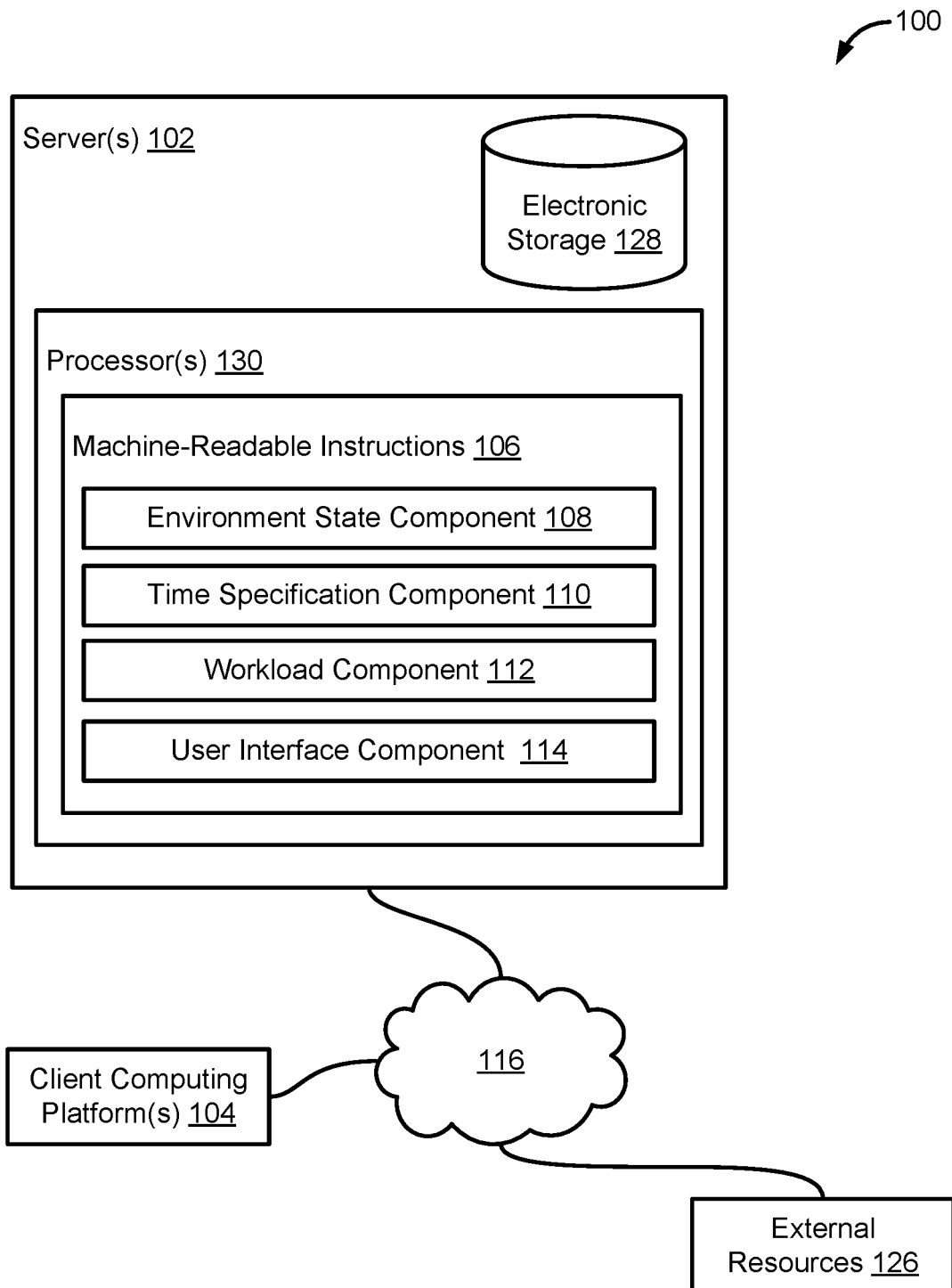
FIG. 1 illustrates a system configured to measure and visualize workload for completing individual units of work, in accordance with one or more implementations.

FIG. 1 illustrates a system 100 configured to measure and visualize workload for completing individual units of work, in accordance with one or more implementations. A parameter by which workload is determined (herein referred to as a "workload parameter") may describe units of work assigned to a user on the basis of one or more of quantities of units of time (e.g., hours and/or other units) associated with completion of individual units of work, and/or other quantities used to measure workload completion. This time-based measure and/or accompanying visualization of workload to complete units of work may provide workers with more insightful data so that they make sure that they work on the units of work within the time suggested, allowed, and/or allotted (which can facilitate staying within budgets and/or tracking performance efficiency of workers.

In some implementations, system 100 may include one or more of one or more servers 102, one or more client computing platforms 104, external resources 126, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may include one or more of non-transitory electronic storage 128, one or more processors 130 configured by machine-readable instructions 106, and/or other components. Machine-readable instructions 106 may include one or more instruction components. The instruction components may include computer program components. Executing the machine-readable instructions 106 may cause server(s) 102 to facilitate measuring and visualizing workload for completing individual units of work. The instruction components may include one or more of an environment state component 108, a time specification component 110, a workload component 112, a user interface component 114, and/or other instruction components.

Environment state component 108 may be configured to manage environment state information and/or other information used in maintaining a collaboration environment. The environment state information may include one or more of user information, work information, and/or other information used to define, support, and/or otherwise maintain a collaboration environment.

The user information may include values of user parameters and/or other information. The values of the user parameters may be organized in user records corresponding to users interacting with and/or viewing the collaboration environment. The values of the user parameters associated with the users interacting with and/or viewing the collaboration environment may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user interacting with and/or viewing the collaboration environment.

The values of the user parameters may, by way of non-limiting example, specify one or more of: a user name, a group parameter, a user account, user role information, a user department, descriptive user content, a to-email, a from-email, a photo, an organization, a workspace, one or more projects (which may include project parameters defined by one or more work unit records), one or more items of work (which may include one or more unit of work parameters defined by one or more unit of work records), one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given unit of work, a given user selected a given unit of work, a timeframe a given user last interacted with and/or worked on a given unit of work, a time period that a given unit of work has been idle, and/or other interaction parameters), a presence parameter (e.g., indicating presence and/or interaction level at an environment level, unit of work level, project level, task level, application level, etc.), one or more notification settings, one or more progress parameters, status information for one or more units of work the user is associated with (units of work assigned to the user, assigned to other users by the user, completed by the user, past-due date, and/or other information), one or more performance metrics of a given user (e.g., how many units of work the user has completed, how quickly the user completed the units of work, how quickly the user completes certain types of units of work, the efficiency of the user, bandwidth of the user, activity level of the user, etc.), application access information (e.g., username/password for one or more third-party applications), one or more favorites and/or priorities, schedule information, other user parameters for the given user.

User role information may specify individual roles of the individual users in the individual units of work. A role may represent a position of an individual user. The position may be specified based on a description of one or more of job title, level, stage, and/or other descriptions of position. The role may be specified with respect to a company as a whole, a particular unit of work, and/or other considerations. By way of non-limiting illustration, a role may include one or more of chief executive officer (or other officer), owner, manager, supervisor, accountant, associate, employee, entry level, midlevel, senior, administrator, director, foreman, engineer, product developer, human resource officer, artist, art director, and/or other description.

Schedule information for the individual users may include one or more calendar entries associated with the individual users. Individual calendar entries may be associated with the individual quantities of units of time to complete the calendar entries. The individual calendar entries may be associated with individual start dates and individual end dates.

In some implementations, schedule information may be stored locally within electronic storage 128 by virtue of features and/or functionality provided within a collaboration environment. By way of non-limiting illustration, a collaboration environment may have the features and/or functionality of calendar application configured to facilitate calendaring entries into a schedule. It is noted that schedule information may be determined through features and/or functionality provided by one or more external resources 126. By way of non-limiting illustration, an external resource may include a calendar application which may be external to a collaboration environment. The collaboration environment may have permissions to access the external calendar application to determine and/or obtain schedule information.

The work information may include values of one or more work unit parameters. The values of the work unit parameters may be organized in work unit records corresponding to units of work managed, created, and/or assigned within the collaboration environment. A given unit of work may have one or more assignees and/or team members working on the given unit of work. Units of work may be associated with one or more to-do items, action items, objectives, and/or other units of work, one or more users should accomplish and/or plan on accomplishing. Units of work may be created by a given user for the given user and/or created by the given user and assigned to one or more other users. A given unit of work may include one or more of a project, a task, a sub-task, and/or other units of work possibly assigned to and/or associated with one or more users.

By way of non-limiting illustration, the one or more work unit parameters may include one or more of a work assignment parameter, a work management parameter, work creation parameter, and/or other parameters. The values of the work assignment parameter may describe units of work assigned to the individual users. The values of the work management parameter may describe units of work managed by the individual users. The values of the work creation parameter may describe units of work created by the individual users.

In some implementations, values of one or more work unit parameters of a given unit of work may describe the unit of work based on one or more of a unit of work name, a unit of work description, one or more unit of work dates (e.g., a start date, a due date, an end date, a completion date, and/or dates), one or more members associated with a unit of work (e.g., an owner, one or more other project/task members, member access information, and/or other unit of work members and/or member information), a status parameter (e.g., an update, a hardcoded status update, a completed/ uncomplete/mark complete, a measured status, a progress indication, quantity of sub-work units remaining for a given unit of work, completed units of work in a given project, and/or other status parameter), one or more user comment parameters (e.g., permission for who may comments such as a creator, a recipient, one or more followers, and/or one or more other interested parties; content of the comments; one or more times; presence or absence of the functionality of up-votes; one or more hard-coded responses; and/or other parameters.), one or more interaction parameters (e.g., indicating a given unit of work is being worked on/was worked on, given unit of work was viewed, a given unit of work was selected, how long the given unit of work has been idle, a last interaction parameter indicating when and what user last interacted with the given unit of work, users that interacted with the given unit of work, and/or other interaction parameters indicating sources of the interactions, context of the interactions, content of the interactions and/or time for the interactions), one or more file attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, subtasks within a task, etc.,), state of a workspace for a given unit of work (e.g., application state parameters, application status, application interactions, user information, and/or other parameters related to the state of the workspace for a unit of work), dependencies between one or more units of work, one or more custom fields (e.g., priority, cost, stage, and/or other custom fields), quantities of work production for the unit of work (e.g., quantity of lines of code, quantity of lines of copy, etc.), and/or other information.

The values of the work assignment parameter describing units of work assigned to the individual users may be determined based on one or more interactions by one or more users with a collaboration environment. In some implementations, one or more users may create and/or assign one or more units of work to themselves and/or an other user. In some implementations, a user may be assigned a unit of work and the user may effectuate a reassignment of the unit of work from the user or one or more other users.

In some implementations, values of the work assignment parameter may indicate that a status parameter of a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date). In some implementations, for the purposes of measuring workload, values of the work assignment parameter for a unit of work indicating a status of "marked complete" and/or "complete" may be treated as if the unit of work is no longer assigned to the user for the purpose of measuring a current workload of the user. In some implementations, values of the work assignment parameter may indicate that a portion of a unit of work has been completed. By way of non-limiting illustration, a unit of work may be assigned to be completed in a certain quantity of days between a start date and an end date. A user may provide input on a daily-basis (or other basis) indicating that a portion of the unit of work was completed.

By way of non-limiting illustration, environment state information may specify values of the work unit parameters describing a first unit of work currently assigned to a first user. The first unit of work may be associated with a start date, an end date, quantity of days spanning between the start date and the end date, and/or other information.

In some implementations, the time specification component 110 may be configured to determine and/or obtain time specification information and/or other information for the individual users. The time specification information may specify individual quantities of units of time associated with completion of individual units of work assigned to the individual users. An individual unit of time may comprise one or more of a minute, an hour, a fraction (or percentage) of an hour, and/or other unit of time. By way of non-limiting illustration, the time specification information may specify a first quantity of units of time (e.g., 12 hours) for the first unit of work currently assigned to the first user.

In some implementations, quantities of units of time associated with completion of individual units of work may include one or more of actual quantities of units of time, estimated quantities of units of time, and/or other measures. In some implementations, actual quantities of units of time associated with completion of individual units of work may include one or more of user input of the quantities of units of time associated with completion of individual units of work, historical quantities of units of time associated with completion of individual units of work, quantities of units of time remaining until individual due dates of individual units of work, and/or other measures. In some implementations, estimated quantities of units of time associated with completion of individual units of work may include quantities of units of time estimated based on one or more of role of individual users assigned to the units of time, complexity of the individual units of work, and/or other measures.

In some implementations, the time specification component 110 may be configured to obtain user input comprising user entry and/or selection of the individual quantities of units of time associated with completion of individual units of work. The time specification component 110 may be configured to determine the time specification information based on the user input. The user input may be provided by a user interface (see, e.g., user interface component 114 and/or FIG. 6).

In some implementations, environment state information may be updated as users continue to interact with the collaboration environment over time. The environment state component 108 may store and/or archive the environment state information periodically and/or based on user request to archive. In some implementations, the environment state component 108 may store historical environment state information specifying historical user information, work information, time specification information, and/or other information. By way of non-limiting illustration, the historical environment state information may specify historical values of work unit parameters of the users, historical time specification information, and/or other information. The historical values of the work unit parameters may describe individual historical quantities of units of time associated with individual units of work previously assigned to the individual users.

The time specification component 110 may be configured to determine the time specification information based on the historical environment state information and/or other information. For example, the previous assignment of units of work, previous determination of the individual quantities of units of time associated with the individual units of time, and/or other historical information may be used for current determinations of quantities of units of time. By way of non-limiting illustration, by virtue of the historical environment state information describing the first quantity of units of time is associated with the first unit of work as previously assigned to the first user, the time specification component 110 may be configured to determine the first quantity of units of time for the first unit of work as currently assigned to the first user.

The time specification component 110 may be configured to obtain user role information from environment state component 108. The time specification component 110 may be configured to determine the time specification information based on the user role information and/or other information. For example, an individual role may be associated with individual quantities of units of time for individual units of work. By way of non-limiting illustration, a user having a "manager" role may be automatically assigned a first predetermined quantity of units of time for a given unit of work, while another user having an "employee" role may be automatically assigned a second predetermined quantity of units of time for the given unit of work. Users having other roles may be automatically assigned predetermined quantities of units of time for individual units of work.

In some implementations, the time specification component 110 may be configured to determine and/or obtain production specification information and/or other information for the individual units of work. The production specification information may specify individual quantities of units of work production associated with completion of individual units of work assigned to the individual users. An individual unit of work production may comprise one or more of a line of code, a line (and/or word, sentence, paragraph, and/or page) of copy, and/or other unit of work production. By way of non-limiting illustration, the production specification information may specify a first quantity of units of work production for the first unit of work currently assigned to the first user. The first quantity of units of work production may include one or more of a quantity of lines of code, a quantity of lines of copy, and/or other information. In some implementations, individual quantities of units of work production associated with completion of individual units of work may convey a level of complexity of the individual units of work.

In some implementations, different levels of complexity may correspond to different quantities of units of time association with completion of the individual units of work. In some implementations, a given level of complexity of a unit of work may be set by a user and/or administrator to correspond to a given quantity of units of time associated with the completion of the unit of work.

The time specification component 110 may be configured to obtain user input comprising user entry and/or selection of the individual quantities of units of work production associated with individual units of work. The time specification component 110 may be configured to determine the production specification information based on the user input. User input may be provided by a user interface.

The time specification component 110 may be configured to determine the production specification information based on the historical environment state information and/or other information. For example, the previous assignment of units of work, previous determination of the individual quantities of units of work production associated with the individual units of time, and/or other historical information may be used for current determinations of quantities of units of work production. By way of non-limiting illustration, by virtue of the historical environment state information describing the first quantity of units of work production is associated with the first unit of work as previously assigned to the first user, the time specification component 110 may be configured to determine the first quantity of units of work production for the first unit of work as currently assigned to the first user.

The time specification component 110 may be configured to obtain user role information from environment state component 108. The time specification component 110 may be configured to determine the production specification information based on the user role information and/or other information. For example, an individual role may be associated with individual quantities of units of work production for individual units of work.

The workload component 112 may be configured to determine values of a workload parameter for individual units of work. The values of the workload parameter may be determined based on one or more of environment state information, time specification information, production specification information, user role information, and/or other information. One or more values of the workload parameter may describe one or more of the individual quantities of units of time associated with completion of the individual units of work. The one or more values of the workload parameter may be described in relation to the individual start dates and the individual end dates, and/or other quantities used to measure workload to complete units of work. By way of non-limiting illustration, a first value of the workload parameter may be determined for the first unit of work. The first value may describe the first quantity of units of time to complete the first unit of work in relation to the start date and the end date of the first unit of work. In some implementations, a value may describe the first quantity of units of work production of the first unit of work in relation to the start date and the end date of the first unit of work.

In some implementations, describing the individual quantities of units of time associated with the individual units of work in relation to the individual start dates and the individual end dates may include determining individual quantities of units of time per day for individual days between the individual start dates and the individual end dates. The individual quantities of units of time per day for individual days between the individual start dates (and/or current dates) and the individual end dates may be determined by dividing the individual quantities of units of time associated with the individual units of work by the quantity of days spanning between the individual start dates and the individual end dates, inclusively. The quantity of days may include counts of workweek days (e.g., skipping weekend days) and/or may include weekend days. By way of non-limiting illustration, determining the first value of the workload parameter may include determining the individual quantities of units of time per day for the individual days between the start date and the end date of the first unit of work. For example, the first quantity of units of time (e.g., 12 hours) may be divided by the number of days spanning between the start date and the end date (e.g., three days) to determine individual quantities of units of time per day between the start date and the end date (e.g., four hours).

In some implementations, workload component 112 may be configured to reduce the individual quantities of units of time associated with completion of the individual units of work as time passes. This may provide a way to reflect remaining amount of work to be completed. In some implementations, workload component 112 may be configured to reduce the individual quantities of units of time associated with completion of the individual units of work by individual quantities of units of time per day multiplied by the quantity of days that have passed since the individual start dates. The reduction may be based on real world passage of time and/or other time measures. The reduction may or may not count weekend days.

By way of non-limiting illustration, workload component 112 may be configured to determine a second quantity of units of time (e.g., four hours) per day for the individual days between the start date and the end date for completing the first unit of work (e.g., three days) as described above (e.g., for the first quantity of units of time being 12 hours). Based on the passage of one day (e.g., or four hours of work dedicated to the first unit of work) since the start date of the first unit of work, workload component 112 may reduce the first quantity of units of time (e.g., the 12 hours) for completing the first unit of work by the second quantity of units of time (e.g., the four hours). Thus, a time adjusted quantity of units of time to complete the first unit of work as of the second day may be, for example, eight hours. Similarly, based on the passage of two days since the start of the first unit of work, workload component 112 may reduce the first quantity of units of time (e.g., the 12 hours) for completing the first unit of work by the second quantity of units of time (e.g., the four hours) multiplied by two days. Thus, a time adjusted (e.g., reduced) quantity of units of time to complete the first unit of work by the third day may be, for example, four hours. Since the first unit of work was allocated to three days, this may convey that the first user may expect to do four hours of work on the third day.

In some implementations, workload component 112 may be configured to reduce the individual quantities of units of time associated with completion of the individual units of work by individual quantities of units of time actually worked per day multiplied by the quantity of days the work was actually completed on. In some implementations, workload component 112 may be configured to obtain user input conveying individual completed quantities of units of time for the individual units of work in a given day by the users. By way of non-limiting illustration, first user input from the first user may convey a given quantity of units of time completed for the first unit of work for the given day (e.g., two hours). Subsequently, workload component 112 may be configured to reduce the individual quantities of units of time associated with completion of the individual units of work by the individual completed quantities of units of time input by the users. By way of non-limiting illustration, the first quantity of units of time (e.g., the 12 hours) for completing the first unit of work may be reduced by the given quantity of units of time (e.g., the two hours). Accordingly, by the second day, a reduced quantity of units of time to complete the first unit of work may be the first quantity less the second quantity (e.g., 10 hours).

In some implementations, workload component 112 may be configured to increase the individual quantities of units of time per day associated with completion of the individual units of work as time passes and/or work is not completed. By way of non-limiting illustration, if a day passes where a user did not actually work on/complete some of a unit of work (by indicating such in a user interface), then a quantity of units of time associated with the unit of work may not be reduced and/or a quantity of units of time per day to complete the unit of work may increase. In this way, the current quantity of units of time associated with the completion of the unit of work may be carried into the remaining days until a due date. As a result, individual quantities of units of time per day for individual days between a current date and an end date may increase for those remaining days between the current date and the end date.

In some implementations, describing the individual quantities of units of work production associated with the individual units of work in relation to the individual start dates and the individual end dates may include determining individual quantities of units of work production per day for individual days between the individual start dates and the individual end dates. The individual quantities of units of work production per day for individual days between the individual start dates and the individual end dates may be determined by dividing the individual quantities of units of work production associated with the individual units of work by the quantity of days spanning between the individual start dates and the individual end dates, inclusively. The quantity of days may include counts of workweek days (e.g., skipping weekend days) and/or may include weekend days. By way of non-limiting illustration, determining a value of the workload parameter may include determining the individual quantities of units of work production per day for the individual days between the start date and the end date of the first unit of work. For example, the quantity of units of work production may be divided by the number of days spanning between the start date and the end date to determine individual quantities of units of work production per day between the start date and the end date.

User interface component 114 may be configured to effectuate presentation of individual user interfaces on individual client computing platforms of one or more client computing platforms 104. For example, the individual client computing platforms may access a user interface over network 116. A given user interface may be configured to facilitate measuring and/or visualizing workload associated with completion of individual units of work.

The user interface component 114 may be configured to effectuate presentation of a user interface based on one or more of the values of the workload parameter for the individual units of work (see, e.g., workload component 112) and/or other information. In some implementations, the user interface may display, for individual units of work, relationships between one or more of the individual quantities of units of time to complete the individual units of work, the individual start dates, the individual end date and/or other relationships. In some implementations, the user interface may display, for individual units of work, relationships between one or more of the individual quantities of units of work production of the individual units of work and the individual start dates and the individual end dates of individual units of work assigned to the individual users, and/or other relationships. By way of non-limiting illustration, the user interface may display the first quantity of units of time to complete the first unit work in relation to the start date and the end date for the first unit of work.

The user interface may include one or more user interface portions. By way of non-limiting illustration, a user interface may include one or more of an input portion, a display portion, and/or other portions. Individual portions may include one or more user interface elements configured to facilitate user interaction with the user interface. By way of non-limiting illustration, user interface elements may include one or more of text input fields, drop down menus, check boxes, display windows, virtual buttons, and/or other elements configured to facilitate user interaction.

An input portion of a user interface may be configured to obtain user input comprising user entry and/or selection of one or more of the individual quantities of units of time associated with completion of individual units of work, the individual quantities of units of work production associated with completion of individual units of work, and/or other information. The input portion may comprise one or more text input fields, one or more check boxes, one or more drop down menus, and/or other user interface elements configured to accept user entry and/or selection of values of quantities of units of time.

A display portion may be configured to display a visualization of the relationships between the individual quantities of units of time of the individual units of work and the individual start dates and the individual end dates for individual units of work assigned to individual users, and/or other relationships. A display portion may be configured to display a visualization of the relationships between the individual quantities of units of work production of the individual units of work and the individual start dates and the individual end dates of individual units of work assigned to the individual users, and/or other relationships. In some implementations, the display portion may include one or more of a date axis representing calendar dates, a workload axis representing units of time (and/or units of work production), and/or other components. In some implementations, representations of the individual quantities of units of time (and/or units of work production) associated with the individual units of work may be shown relative the workload axis. In some implementations, the representations of the individual quantities of units of time (and/or units of work production) associated with the individual units of work shown relative the workload axis may include quantities of units of time per day (and/or quantities of units of work production per day). The workload axis may include visual increments of units of time. The relationship with the individual start dates and the individual end dates may be shown relative the date axis. The date axis may include visual increments of days of a month.

In some implementations, the display portion may include a unit of work display portion providing a visualization of the individual units work in relation to individual start dates, end dates, and/or quantity of units of time to complete the unit of work. Individual units of work may be represented in the user interface by individual user interface elements. The individual user interface elements may have one or more of individual length dimensions, individual height dimensions, and/or other features. The start dates and end dates of the individual units of work may be visualized based on the length dimension of the individual interface elements spanning the date axis. A representation of quantities of units of times to complete the individual units of work may be visualized based on the height dimension of the individual interface elements spanning the workload axis.

In some implementations, the length dimension of the user interface elements configured to visualize a span of days may be updated as days pass and/or the users convey completion of portions of work. In some implementations, the length dimension may shorten as days pass and/or the users convey completion of portions of work. In some implementations, the changes of the length dimension may cause changes in the height dimension in order to accurately reflect a total quantity of units of time remaining to complete the work. In some implementations, the changes of the length dimension may cause changes in the height dimension to stay the same if the height dimension measures quantity of units of time per day and the user is completing the work on that schedule.

In some implementations, the height dimension of the user interface elements may convey the individual quantities of units of time to complete the individual units of work. By showing individual quantities of units of time to complete units of work in the workload axis using the height dimension, and a span of days between the individual start dates and the individual end dates in the date axis using the length dimension, an area of the individual user interface elements may be conveyed. Size of the area may provide a visual conveying how much work has to be done. The size of the area may decrease as days pass and/or portions of work are indicated as completed. The size of the area may increase as days pass and/or portions of work are indicated as not completed. While the area in this implementation may not convey a particular measure, it may at least provide a visual of how much work has to be done based on the relative area of the user interface element compared to others.

In some implementations, user interface component 114 may be configured to update the individual height dimensions of the individual user interface elements as shown relative the workload axis. The update to the individual height dimensions may reflect the reduction of the individual quantities of units of time associated with completion of the individual units of work. In other words, reducing the height of the individual user interface element may reflect a partial completion (e.g., by a user) of the individual unit of work.

In some implementations, user interface component 114 may be configured to update the individual height dimensions of the individual user interface elements as shown relative the workload axis to reflect the reduction of the individual quantities of units of time associated with completion of portions of the individual units of work input by one or more users. In other words, a user may input an amount of time they completed for an individual unit of work in a given day. The amount of time associated with completion of that unit of work may be reduced (via workload component 112) by the amount of time the user input. Therefore, the height dimension shown relative the workload axis of the individual user interface element may be reduced to indicate the (new) amount of time associated with completion of the unit of work (or amount of time remaining to complete the unit of work).

In some implementations, the height dimension of the user interface elements may comprise the individual quantities of units of time (and/or units of work production) per day for individual days between the individual start dates and the individual end dates. By showing individual quantities of units of time per day (and/or quantities of units of work production per day) in the workload axis using the height dimension, and a span of days between the individual start dates and the individual end dates in the date axis using the length dimension, an area of the individual user interface elements may be conveyed. Size of the area may provide a visual conveying how much work the user has to do. The size of the area may decrease as days pass and/or portions of work are completed and/or days pass. The size of the area may increase as days pass and portions of work are not completed. The individual quantities of units of time associated with the completion of the individual units of work (total and/or remaining) may be reflected in individual areas encompassed by the individual length dimensions and the individual height dimensions of the individual user interface elements.

An update to the individual height dimensions may reflect an increase of the individual quantities of units of time per day associated with completion of the individual units of work. Increasing the height of the individual user interface element may reflect when work has not been completed, causing more work per day to be required for remining days until a due date in order to complete the unit of work by the due date.

Figure 3:
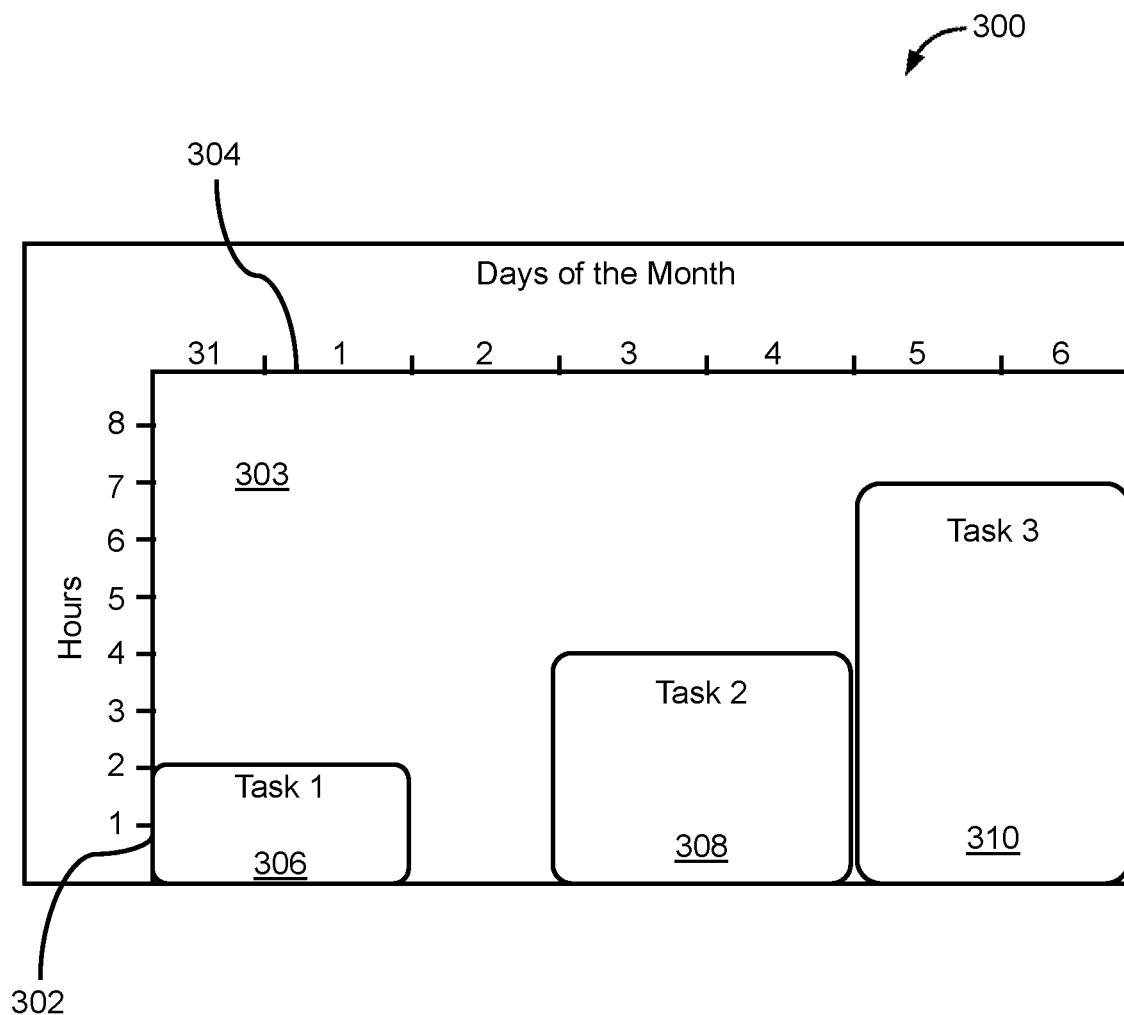
FIG. 3 illustrates an exemplary user interface, in accordance with one or more implementations.

FIG. 3 illustrates an exemplary user interface 300 visualizing a measure of workload for completing individual units of work, in accordance with one or more implementations. The user interface 300 may display relationships between the individual quantities of units of time of individual units of work and individual start dates and individual end dates of the individual units of work. The user interface 300 may include one or more of a date axis 304 representing calendar dates, a workload axis 302 representing units of time, a workload display portion 303, and/or other components. The individual quantities of units of time associated with completion of the individual units work may be represented relative the workload axis 302. The relationship of the individual quantities of units of time with the individual start dates and the individual end dates of the individual units of work may be shown relative the date axis 304. User interface elements representing the individual units of work (described for illustrative purposes as "task(s)") in relation to the start dates and end dates may be shown in the workload display portion 303. The user interface elements may be rectangular in shape, substantially rectangular in shape, and/or may have other shapes (e.g., circular).

By way of non-limiting illustration, the units of work associated with a user may include one or more of a first unit of work 306, a second unit of work 308, a third unit of work 310, and/or other units of work. The first unit of work 306 may have a start date of the $31^{st}$ of one month and an end date of the $1^{st}$ of the following month. The first unit of work 306 may be represented by a user interface element spanning the portion of the date axis 304 illustrating the $31^{st}$ of one month to the $1^{st}$ of the following month. The second unit of work 308 may have a start date of the $3^{rd}$ of the month and an end date of the $4^{th}$ of the month. The second unit of work 308 may be represented by a user interface element spanning the portion of the date axis 304 illustrating the $3^{rd}$ the month to the $4^{th}$ of the month. The third unit of work 310 may have a start date of the $5^{th}$ of the month and an end date of the $6^{th}$ of the month. The third unit of work 310 being represented by a user interface element spanning the portion of the date axis 304 illustrating the $5^{th}$ of the month to the $6^{th}$ of the month.

The user interface 300 may visualize the individual quantities of units of time associated with completion of the individual units of work in relation to the individual start dates and the individual end dates based on individual height dimensions with respect to the workload axis 302. The height of a user interface element may represent a quantity of units of time per day (shown for illustrative purposes in increments of 1 hour). The length of a user interface element may represent the time span of a unit of work from a start date to an end date. It is noted that the user interface 300 may be modified to alternatively and/or concurrently visualize the individual quantities of units of work production associated with the individual units of work in relation to the individual start dates and the individual end dates. Accordingly, while some descriptions of features in user interface 300 herein may be directed to units of time, this is for illustrative purposes only and not to be considered limiting. Instead, it is noted that those skilled in the art may understand the application of these features may extend, mutatis mutandis, to quantities of units of work production.

Determining the height dimension may be based on individual quantities of units of time per day for individual days between the individual start dates and the individual end dates. By way of non-limiting illustration, time specification information may specify that the first unit of work 306 may be associated with a first quantity of units of time to complete the first unit of work 306. The first quantity may include, for illustrative purposes, 4 hours. Since the first unit of work 306 spans two days and is associated with 4 hours, then the individual quantities of units of time per day for individual days between the start date and the end date may comprise 2 hours per day. This may be illustrated by the user interface element for the first unit of work 306 having a length spanning between the 31$^{st}$ of the prior month to the 1st of the following month, and a height of 2 hours (representing a per day measure).

By way of non-limiting illustration, time specification information may specify that the second unit of work 308 may be associated with a second quantity of units of time to complete the second unit of work 308. The second quantity may include, for illustrative purposes, 8 hours. Since the second unit of work 308 spans 2 days and is associated with 8 hours, then the individual quantities of units of time per day for individual days between the start date and the end date may comprise 4 hours per day. The time specification information may further specify that the third unit of work 310 may be associated with a third quantity of units of time to complete the third unit of work 310. The third quantity may include, for illustrative purposes, 14 hours. Since the third unit of work 310 spans 2 days and is associated with 14 hours, then the individual quantities of units of time per day for individual days between the start date and the end date may comprise 7 hours per day.

Figure 4:
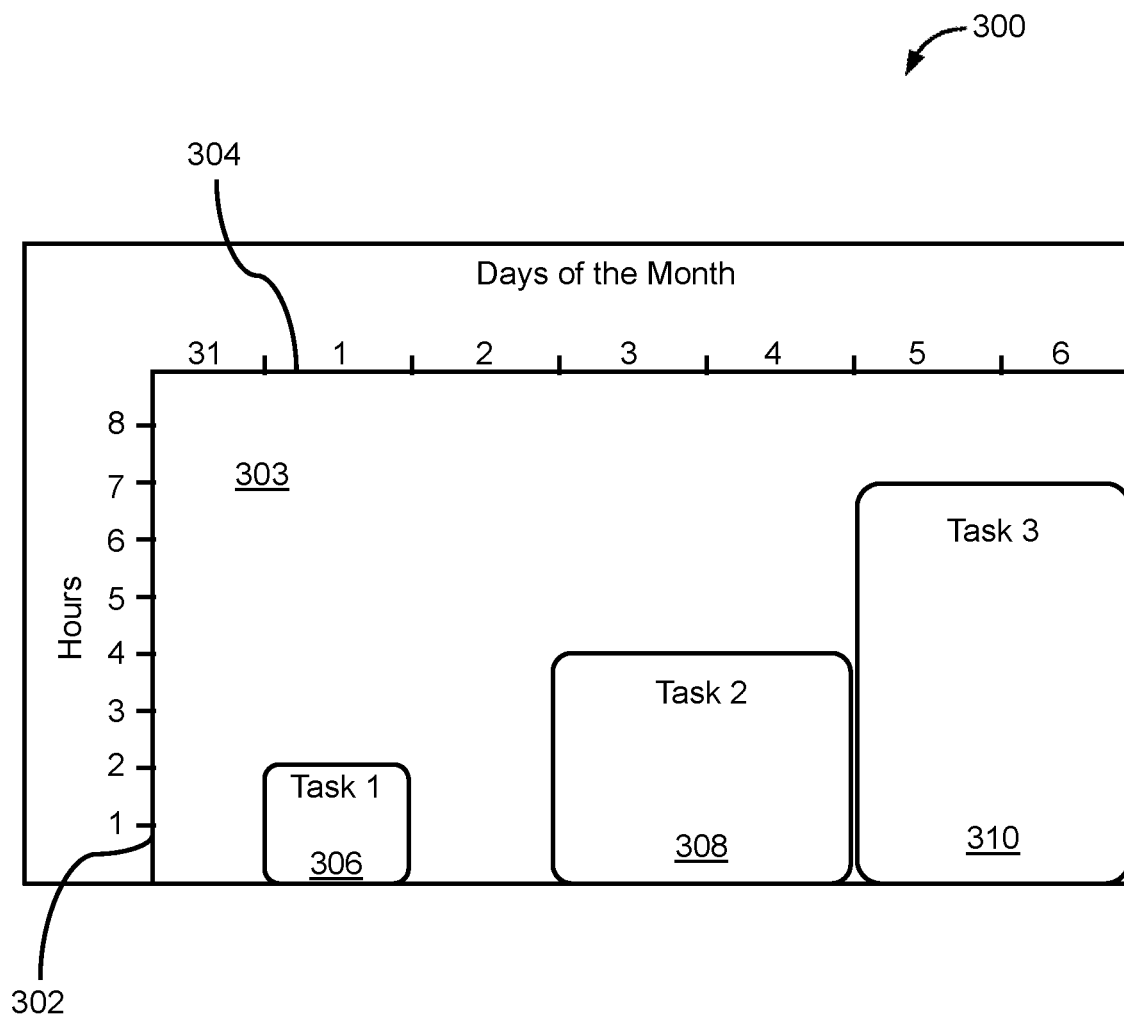
FIG. 4 illustrates an exemplary user interface, in accordance with one or more implementations.

FIG. 4 illustrates the user interface 300 visualizing workload for completing individual units of work showing the first quantity of units of time to complete the first unit of work 306 being reduced based one or more of the passage of time (e.g., one day) and/or a user indication of work completed in the first day (e.g., 31$^{st}$ of the month). By way of non-limiting illustration, based on the passage of one day since the start date of the first unit of work 306, the first quantity of units of time (e.g., the 4 hours) for completing the first unit of work 306 may be reduced by the quantity of units of time per day (e.g., 2 hours). Thus, a time adjusted quantity of units of time to complete the first unit of work 306 as of the second day may be 2 hours. This adjustment may be reflected in the user interface element representing the first unit of work 306, where length dimension is reduced to span the 1$^{st}$ of the month, and the height dimension reflects 2 hours per day remaining to complete the work.

Figure 5:
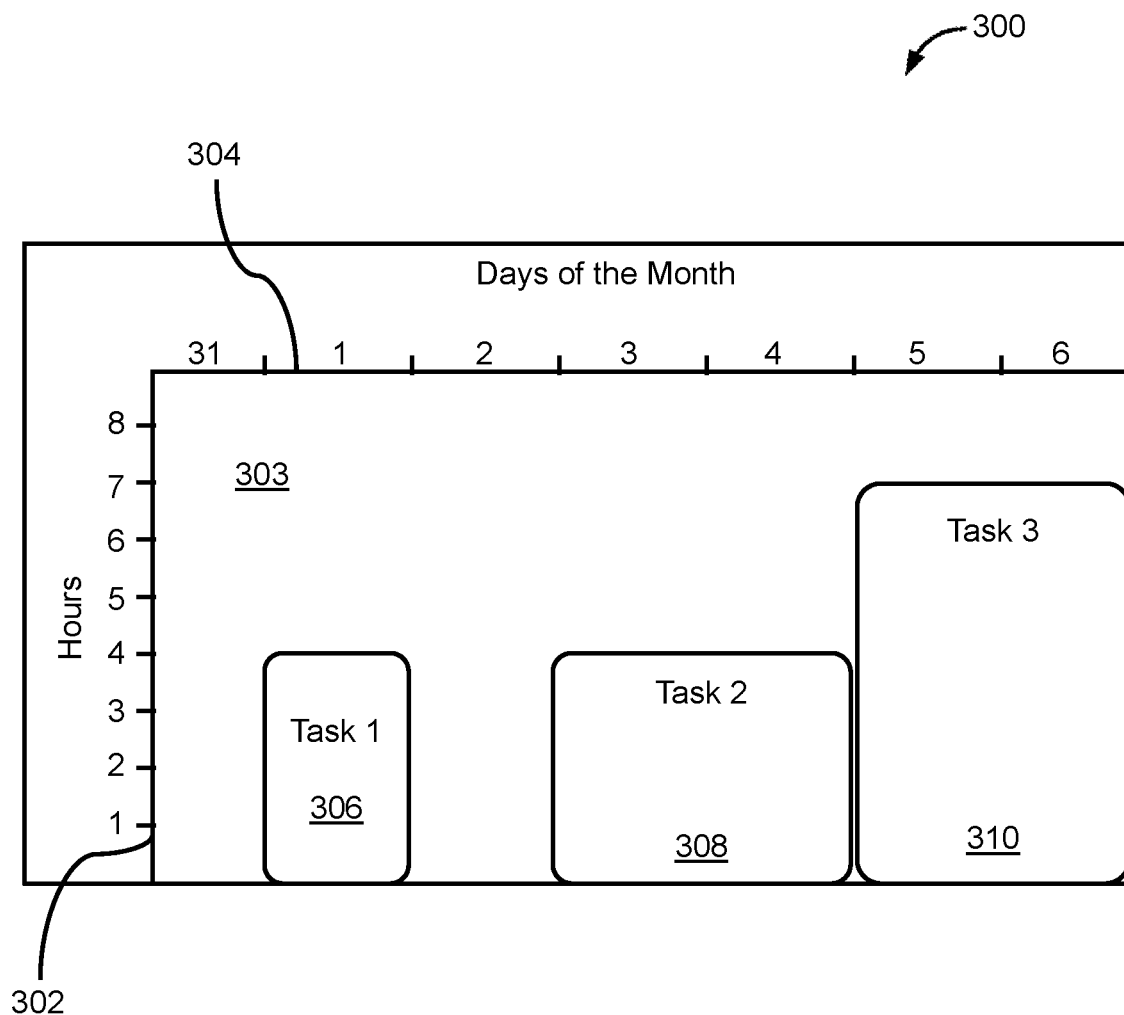
FIG. 5 illustrates an exemplary user interface, in accordance with one or more implementations.

FIG. 5 illustrates the user interface 300 visualizing workload for completing individual units of work showing the quantity of units of time per day to complete the first unit of work 306 being increased based one or more of the passage of time (e.g., one day) and/or a user indication of work not being completed on the first day (e.g., 31st of the month). By way of non-limiting illustration, based on the passage of one day since the start date of the first unit of work 306, the first quantity of units of time (e.g., the 4 hours) for completing the first unit of work 306 may be the same but the quantity of units of time per day may be increased by the quantity of units of time per day (e.g., 2 hours) that were not completed. Thus, a time adjusted quantity of units of time per day to complete the first unit of work 306 as of the second day may be 4 hours. This adjustment may be reflected in the user interface element representing the first unit of work 306, where length dimension is reduced to span the 1$^{st}$ of the month, and the height dimension is increased to reflect 4 hours per day rem ining to complete the work.

It is noted that FIGS. 3-5 are for illustrative purposes only and are not to be considered limiting. Instead, it is to be understood that the user interface 300 may be configured in other ways and/or including other elements in accordance with one or more implementations of the system 100 presented herein.

Figure 6:
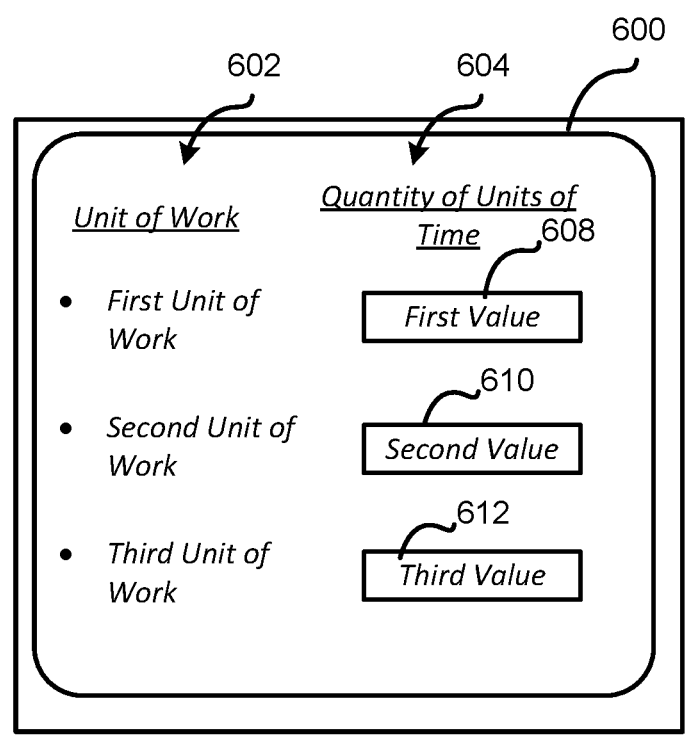
FIG. 6 illustrates an exemplary user interface, in accordance with one or more implementations.

FIG. 6 illustrates a user interface 600, in accordance with one or more implementations. The user interface 600 may include one or more user interface elements configured to facilitate user interaction with the user interface 600. The user interaction may include input to specify individual quantities of units of time associated with completion of individual units of work, show individual quantities of units of time associated with completion of individual units of work, and/or other information.

In some implementations, the user interface 600 may include a portion 602 displaying units of work assigned to an individual user, a portion 604 displaying user interface elements configured to obtain user input to specify individual quantities of units of time associated with completion of individual units of work, and/or other components. By way of non-limiting illustration, a first user interface element 608 may include one or more of a text input box, drop down menu, and/or other element configured to obtain input to specify a first value of a quantity of units of time to be associated with a first unit of work. The first value may be set based on historical environment state information and/or may be overwritten by user input or not. A second user interface element 610 may include one or more of a text input box, drop down menu, and/or other element configured to obtain input to specify a second value of a quantity of units of time to be associated with a second unit of work. The second value may be based on user role information for the second unit of work and/or may be overwritten by user input. A third user interface element 612 may include one or more of a text input box, drop down menu, and/or other element configured to obtain input to specify a third value of a quantity of units of time to be associated with a third unit of work. The third value may be based on user input. FIG. 6 is for illustrative purposes only and is not to be considered limiting. Instead, it is to be understood that the user interface 600 may be configured in other ways and/or including other elements to facilitate other user interaction in accordance with one or more implementations of the system 100 presented herein.

Figure 7:
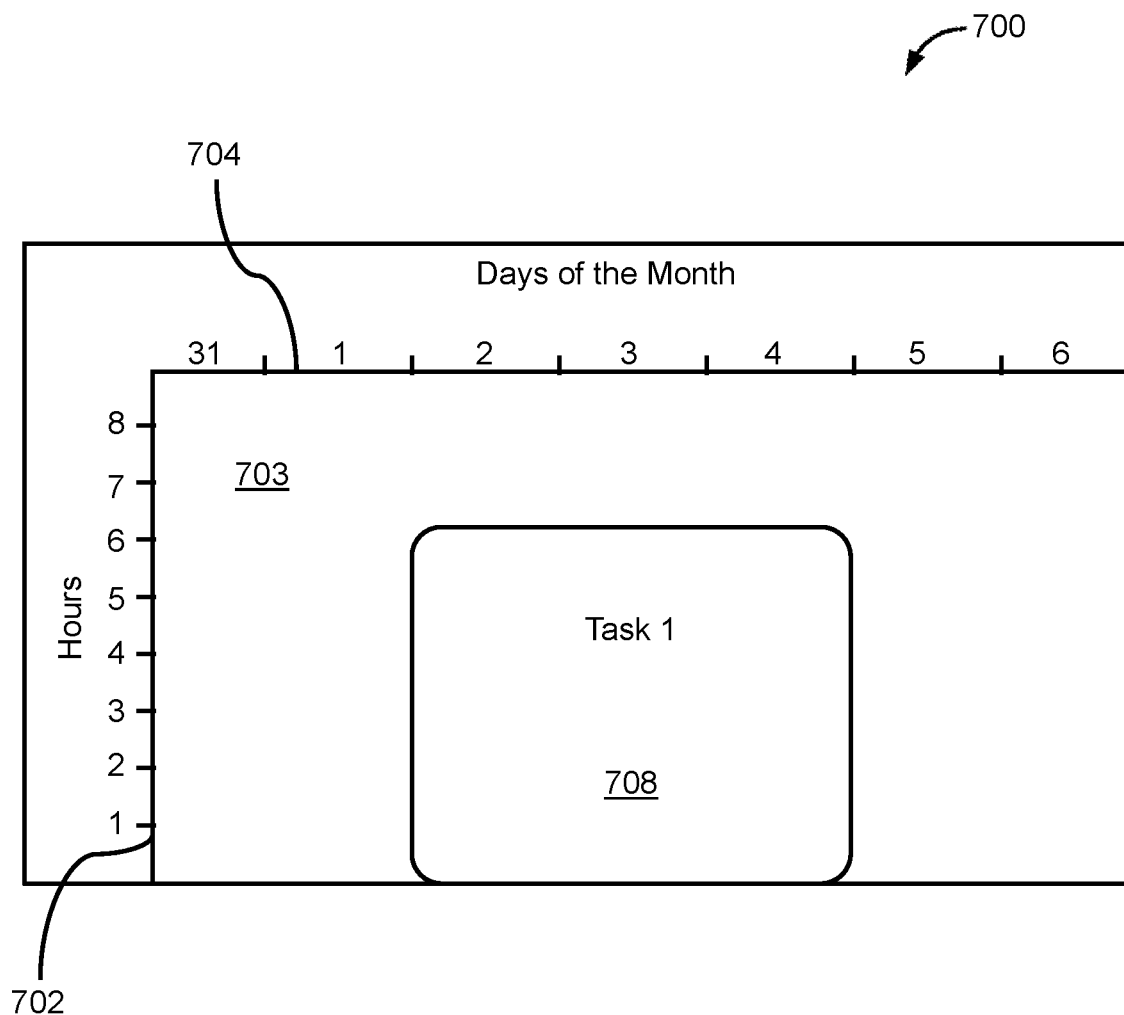
FIG. 7 illustrates an exemplary user interface, in accordance with one or more implementations.

FIG. 7 illustrates an exemplary user interface 700 visualizing a measure of workload for completing individual units of work, in accordance with one or more implementations. The user interface 700 may display relationships between the individual quantities of units of time of individual units of work and individual start dates and individual end dates of the individual units of work. The user interface 700 may include one or more of a date axis 704 representing calendar dates, a workload axis 702 representing units of time, a workload display portion 703, and/or other components. The individual quantities of units of time associated with completion of the individual units work may be represented relative the workload axis 702. The relationship of the individual quantities of units of time with the individual start dates and the individual end dates of the individual units of work may be shown relative the date axis 704. User interface elements representing the individual units of work (described for illustrative purposes as "task(s)") in relation to the start dates and end dates may be shown in the workload display portion 703.

By way of non-limiting illustration, the units of work associated with a user may include one or more of a first unit of work 708 and/or other units of work. The first unit of work 708 may have a start date of the 2$^{nd}$ of a month and an end date of the 4th of the month. The first unit of work 708 may be represented by a user interface element spanning the portion of the date axis 304 illustrating the 2$^{nd}$ of the month to the 4th of the month.

The user interface 700 may visualize the individual quantities of units of time associated with completion of the individual units of work in relation to the individual start dates and the individual end dates based on individual height dimensions with respect to the workload axis 702. The height of user interface element may represent a quantity of units of time associated with completion of the units of work (shown for illustrative purposes in increments of 1 hour). The length of a user interface element may represent the time span of a unit of work from a start date to an end date. It is noted that the user interface 700 may be modified to alternatively and/or concurrently visualize the individual quantities of units of work production associated with the individual units of work in relation to the individual start dates and the individual end dates. Accordingly, while some descriptions of features in user interface 700 herein may be directed to units of time, this is for illustrative purposes only and not to be considered limiting. Instead, it is noted that those skilled in the art may understand the application of these features may extend, mutatis mutandis, to quantities of units of work production.

Determining the height dimension may be based on individual quantities of units of time associated with completing the units of work. By way of non-limiting illustration, time specification information may specify that the first unit of work 708 may be associated with a first quantity of units of time to complete the first unit of work 708. The first quantity may include, for illustrative purposes, 6 hours. The user interface element for the first unit of work 708 may have a length spanning between the 2$^{nd}$ and the 4$^{th}$ days, and a height of 6 hours.

Figure 8:
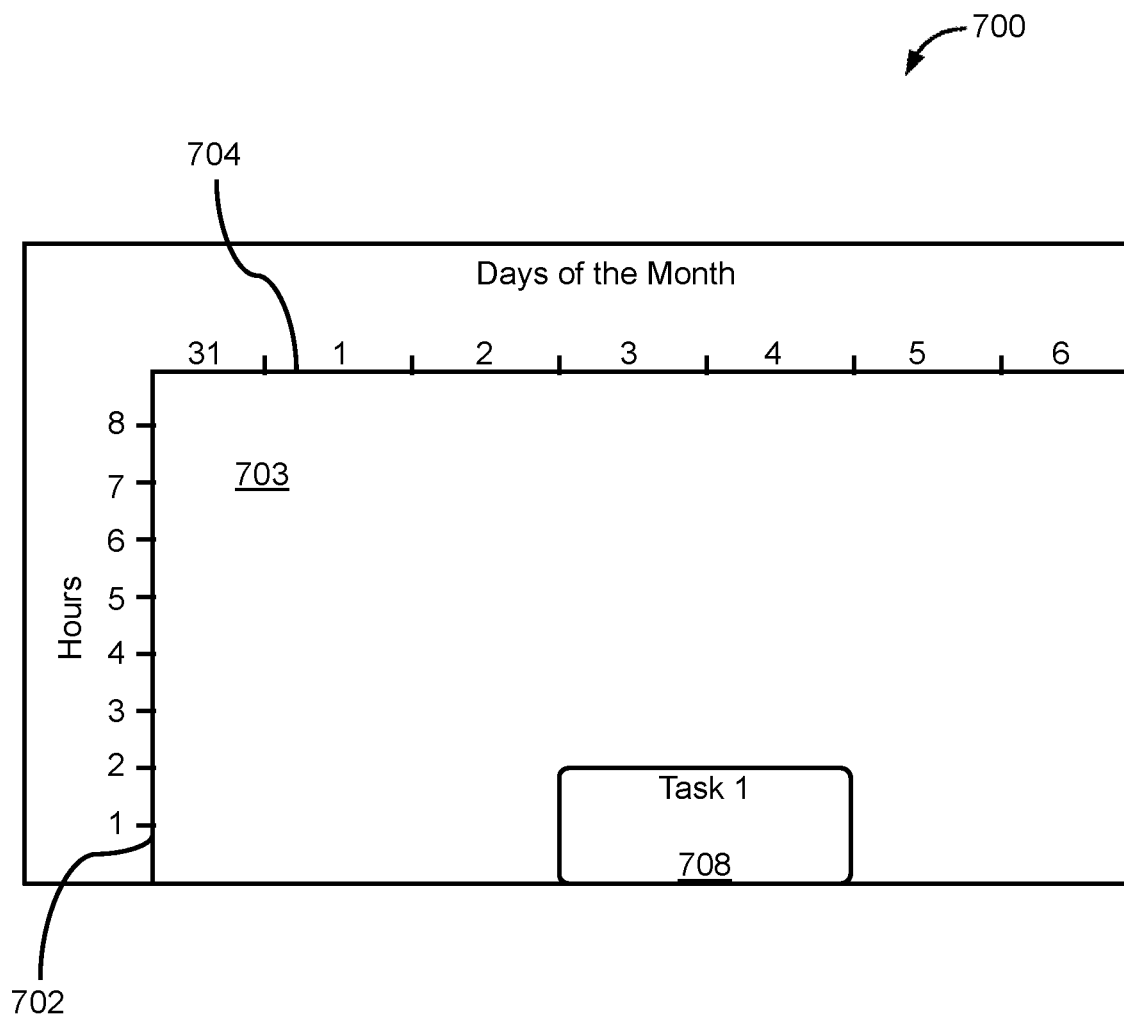
FIG. 8 illustrates an exemplary user interface, in accordance with one or more implementations.

FIG. 8 illustrates the user interface 700 visualizing workload for completing individual units of work showing the first quantity of units of time to complete the first unit of work 708 being reduced based on one or more of the passage of time (e.g., one day) and/or a user indication of work completed in the first day (e.g., 2$^{nd}$ of the month). By way of non-limiting illustration, based on the user completing four hours of work, the first quantity of units of time (e.g., the 6 hours) for completing the first unit of work 708 may be reduced by four hours. Thus, a time adjusted quantity of units of time to complete the first unit of work 708 as of the second day (3$^{rd}$ of the month) may be 2 hours. This adjustment may be reflected in the user interface element representing the first unit of work 708, where length dimension is reduced to span the 3rd day to the fourth day, and the height dimension reflects 2 hours remaining to complete the work.

Returning to FIG. 1, the workload component 112 may be configured to obtaining an indication of completion and/or partial completion of the individual units of work. Completion of individual units of work may be indicated by user input via the collaboration environment selecting "mark complete" (or other input) for the individual units of work. The indications of the completion of the individual units of work may be associated with individual completion dates on which the indications were received.

The workload component 112 may be configured to determine one or more of individual actual quantities of units of time associated with completion of the individual units of work, individual actual quantities of units of work production associated with the individual units of work, and/or other information upon obtaining an indication of completion of the individual units of work. The actual quantities of units of time (and/or units of work production) may be determined by determining a span of days between the individual start dates of the individual units of work and the individual completion dates. The span of days may be multiplied by the individual quantities of units of time per day determined for the individual units of work. The result of the multiplication may comprise the individual actual quantities of units of time.

The workload component 112 may be configured to determine one or more performance metrics for the individual users by comparing the individual actual quantities of units of time (and/or units of work production) associated with completion of the individual units of work with the individual quantities of units of time (and/or units of work production) previously associated with completion of the individual units of work. A performance metric may indicate whether the individual users are performing efficiently, inefficiently, and/or performing in some other manner. Performing efficiently may be indicated when an actual quantity of units of time is equal to and/or less than the previously associated quantity of units of time. Performing inefficiently may be indicated when an actual quantity of units of time is more than the previously associated quantity of units of time.

By way of non-limiting illustration, by virtue of obtaining an indication that a first unit of work was completed within a second quantity of units of time, workload component 112 may be configured to determine a first performance metric for the first user by comparing the first quantity of units of time with the second quantity of units of time. The first performance metric may indicate that the first user was performing inefficiently when the second quantity of units of time is higher than the first quantity of units of time. The first performance metric may indicate that the first user was performing efficiently when the second quantity of units of time is equal to or less than the first quantity of units of time.

In FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform may include one or more processors configured to execute computer program components. The computer program components may be configured to enable an expert or user associated with the given client computing platform to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, and/or other components. Processor(s) 130 may be configured to execute components 108, 110, 112, and/or 114, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 130 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 130 may be configured to execute one or more additional components that may perform some or all of the functionality attributed below to one of components 108, 110, 112, and/or 114.

Figure 2:
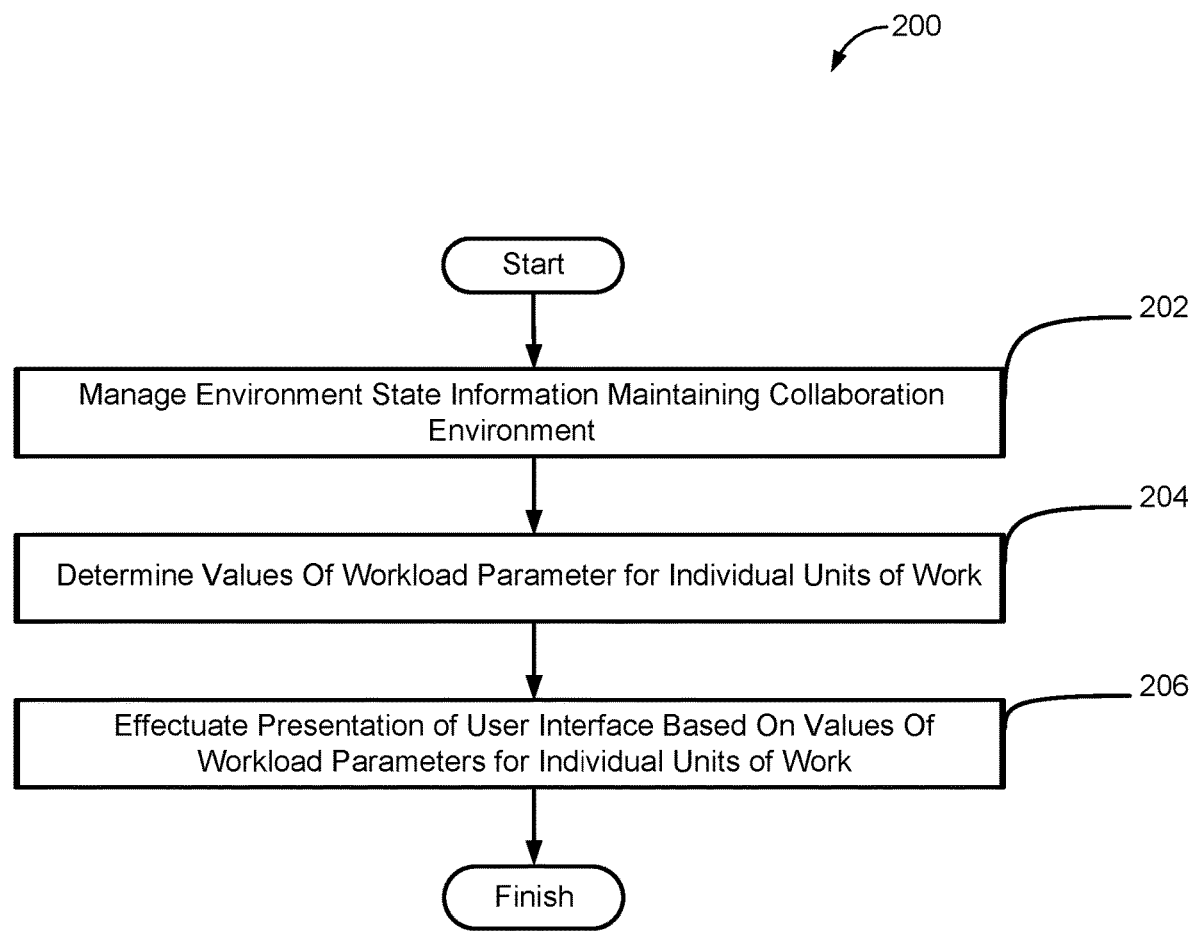
FIG. 2 illustrates a method to measure and visualize workload for completing individual units of work, in accordance with one or more implementations.

FIG. 2 illustrates a method 200 to measure and visualize workload for completing individual units of work, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment. The collaboration environment may be configured to facilitate interaction by users with the collaboration environment. The environment state information may specify values of work unit parameters of the individual units of work. The values of the work unit parameters may describe units of work assigned to individual users within the collaboration environment. Individual units of work may be associated with one or more of individual start dates, individual end dates, and/or other information. Operation 202 may be performed by one or more hardware processors configured by machine-readable instructions including a component that is the same as or similar to environment state component 108, in accordance with one or more implementations.

An operation 204 may determine values of a workload parameter for individual units of work. The values of the workload parameter may be determined based on one or more of the environment state information, the time specification information, and/or other information. The values of the workload parameter may describe the individual quantities of units of time associated with the individual units of work in relation to the individual start dates and the individual end dates of the individual units of work. By way of non-limiting illustration, a first value of the workload parameter may be determined based on one or more of values of the work unit parameters describing the first unit of work, the first quantity of units of time, and/or other information. The first value may describe the first quantity of units of time in relation to the start date and the end date. Operation 204 may be performed by one or more hardware processors configured by machine-readable instructions including a component that is the same as or similar to workload component 112, in accordance with one or more implementations.

An operation 206 may effectuate presentation of a user interface based on the values of the workload parameter for the individual units of work and/or other information. The user interface may display the relationship between the individual quantities of units of time of the individual units of work and the individual start dates and the individual end dates. Operation 206 may be performed by one or more hardware processors configured by machine-readable instructions including a component that is the same as or similar to user interface component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to measure and visualize workload for completing individual units of work, the system comprising:
   one or more physical processors configured by machine-readable instructions to:
   manage, by a server, electronically stored environment state information maintaining a collaboration environment, the collaboration environment being configured to facilitate interaction by users with the collaboration environment, a first user interacting with the collaboration environment via a first remotely located client computing platform communicating with the server over an Internet connection, the environment state information describing a first unit of work currently assigned to a first user, the first unit of work having a start date and a future end date;
   establish the Internet connection between the first remotely located client computing platform and the server;
   determine, by the server, a first value of a workload parameter for the first unit of work, the first value describing a first quantity of units of time to complete the first unit of work;
   effectuate communication of information from the server to the first remotely located client computing platform over the Internet connection so that the first remotely located client computing platform presents a user interface, the user interface being configured based on the first value of the workload parameter for the first unit of work, such that the user interface displays a relationship between the first quantity of units of time, the start date, and the future end date;
   continuously monitor, by the server, the environment state information to determine updates to the environment state information that impact the first value of the workload parameter for the first unit of work; and
   update, by the server and based on continuously monitoring the environment state information, the first value of the workload parameter and the information communicated from the server to the first remotely located client computing platform so that the user interface reflects an up-to-date quantity of units of time to complete the first unit of work by the future end date.

2. The system of claim 1, wherein:
   the first unit of work is represented in the user interface by a first user interface element;
   the first user interface element has a length dimension and a height dimension;
   the user interface includes a date axis representing calendar dates and a workload axis representing units of time; and
   the first quantity of units of time is reflected in an area encompassed by the length dimension and the height dimension of the first user interface element.

3. The system of claim 2, wherein the one or more physical processors are further configured by the machine-readable instructions to:
   determine a quantity of units of time per day for individual days between the start date and the future end date; and
   specify the height dimension as the quantity of units of time per day.

4. The system of claim 3, wherein the one or more physical processors are further configured by the machine-readable instructions to:
   determine that work has not been completed on a given day;
   increase the quantity of units of time per day based on determination that the work has not been completed on the given day; and
   update the height dimension to reflect the increase in the quantity of units of time per day.

5. The system of claim 2, wherein the one or more physical processors are further configured by the machine-readable instructions to:
   obtain user input conveying a completed quantity of units of time for the first unit of work on a given day;
   reduce the first quantity of units of time by the completed quantity of units of time; and
   update the height dimension as shown relative the workload axis to reflect reduction of the first quantity of units of time.

6. The system of claim 3, wherein the one or more physical processors are further configured by the machine-readable instructions to:
   based on real world passage of time, reduce the first quantity of units of time by the quantity of units of time per day multiplied by a quantity of days that have passed since the start date; and
   update the height dimension to reflect reduction of the first quantity of units of time.

7. The system of claim 1, wherein the one or more physical processors are further configured by the machine-readable instructions to obtain time specification information, the time specification information specifying the first quantity of units of time is associated with completion of the first unit of work.

8. The system of claim 7, wherein the one or more physical processors are further configured by the machine-readable instructions to:
   obtain historical environment state information describing the first quantity of units of time as being associated with the completion of the first unit of work as previously assigned to the first user; and
   determine the time specification information based on the historical environment state information such that the time specification information defines the first quantity of units of time for the completion of the first unit of work as currently assigned to the first user based on the first quantity of units of time being associated with the completion of the first unit of work as previously assigned to the first user.

9. The system of claim 7, wherein the one or more physical processors are further configured by the machine-readable instructions to:
obtain user role information specifying a first role of the first user, the first role being associated with the first quantity of units of time for the completion of the first unit of work; and
determine the time specification information based on the user role information.

10. The system of claim 1, wherein the one or more physical processors are further configured by the machine-readable instructions to:
obtain user input information conveying user entry and/or selection of the first quantity of units of time associated with completion of the first unit of work.

11. A method to measure and visualize workload for completing individual units of work, the method comprising:
managing, by a server, electronically stored environment state information maintaining a collaboration environment, the collaboration environment being configured to facilitate interaction by users with the collaboration environment, a first user interacting with the collaboration environment via a first remotely located client computing platform communicating with the server over an Internet connection, the environment state information describing a first unit of work currently assigned to a first user, the first unit of work having a start date and a future end date;
establishing the Internet connection between the first remotely located client computing platform and the server;
determining, by the server, a first value of a workload parameter for the first unit of work, the first value describing a first quantity of units of time to complete the first unit of work;
effectuating communication of information from the server to the first remotely located client computing platform over the Internet connection so that the first remotely located client computing platform presents a user interface, the user interface being configured based on the first value of the workload parameter for the first unit of work, such that the user interface displays a relationship between the first quantity of units of time, the start date, and the future end date;
continuously monitoring, by the server, the environment state information to determine updates to the environment state information that impact the first value of the workload parameter for the first unit of work; and
updating, by the server and based on the continuously monitoring the environment state information, the first value of the workload parameter and the information communicated from the server to the first remotely located client computing platform so that the user interface reflects an up-to-date quantity of units of time to complete the first unit of work by the future end date.

12. The method of claim 11, wherein:
the first unit of work is represented in the user interface by a first user interface element;
the first user interface element has a length dimension and a height dimension;
the user interface includes a date axis representing calendar dates and a workload axis representing units of time; and
the first quantity of units of time is reflected in an area encompassed by the length dimension and the height dimension of the first user interface element.

13. The method of claim 12, further comprising:
determining a quantity of units of time per day for individual days between the start date and the future end date; and
specifying the height dimension as the quantity of units of time per day.

14. The method of claim 13, further comprising:
determining that work has not been completed on a given day;
increasing the quantity of units of time per day based on determination that the work has not been completed on the given day; and
updating the height dimension to reflect the increase in the quantity of units of time per day.

15. The method of claim 12, further comprising:
obtaining user input conveying a completed quantity of units of time for the first unit of work on a given day;
reducing the first quantity of units of time by the completed quantity of units of time; and
updating the height dimension as shown relative the workload axis to reflect reduction of the first quantity of units of time.

16. The method of claim 13, further comprising:
based on real world passage of time, reducing the first quantity of units of time by the quantity of units of time per day multiplied by a quantity of days that have passed since the start date; and
updating the height dimension to reflect reduction of the first quantity of units of time.

17. The method of claim 11, further comprising obtaining time specification information, the time specification information specifying the first quantity of units of time is associated with completion of the first unit of work.

18. The method of claim 17, further comprising:
obtaining historical environment state information describing the first quantity of units of time as being associated with the completion of the first unit of work as previously assigned to the first user; and
determining the time specification information based on the historical environment state information such that the time specification information defines the first quantity of units of time for the completion of the first unit of work as currently assigned to the first user based on the first quantity of units of time being associated with the completion of the first unit of work as previously assigned to the first user.

19. The method of claim 17, further comprising:
obtaining user role information specifying a first role of the first user, the first role being associated with the first quantity of units of time for the completion of the first unit of work; and
determine the time specification information based on the user role information.

20. The method of claim 11, further comprising:
obtaining user input information conveying user entry and/or selection of the first quantity of units of time associated with completion of the first unit of work.

* * * * *